(12) United States Patent
Pan et al.

(10) Patent No.: US 11,669,003 B2
(45) Date of Patent: Jun. 6, 2023

(54) ILLUMINATION SYSTEM AND PROJECTION DEVICE

(71) Applicant: Coretronic Corporation, Hsin-Chu (TW)

(72) Inventors: Haw-Woei Pan, Hsin-Chu (TW); Kuan-Ta Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/504,515

(22) Filed: Oct. 19, 2021

(65) Prior Publication Data

US 2022/0128896 A1 Apr. 28, 2022

(30) Foreign Application Priority Data

Oct. 26, 2020 (CN) .......................... 202011153677.0

(51) Int. Cl.
*G03B 21/20* (2006.01)
*H04N 9/31* (2006.01)
(Continued)

(52) U.S. Cl.
CPC ......... *G03B 21/204* (2013.01); *G02B 26/008* (2013.01); *G02B 27/0938* (2013.01);
(Continued)

(58) Field of Classification Search
CPC .............. G03B 21/204; G03B 21/2066; G03B 21/2033; G03B 21/2013; H04N 9/3158; H04N 9/3161; H04N 9/3164
See application file for complete search history.

(56) References Cited

U.S. PATENT DOCUMENTS

2015/0253653 A1 9/2015 Fujita et al.
2016/0223892 A1* 8/2016 Takahashi ............... F21V 14/08

FOREIGN PATENT DOCUMENTS

CN 103713455 4/2014
CN 104641289 5/2015
(Continued)

OTHER PUBLICATIONS

"Office Action of China Counterpart Application", dated Jan. 18, 2023, p. 1-p. 10.

*Primary Examiner* — Ryan D Howard
(74) *Attorney, Agent, or Firm* — JCIPRNET

(57) ABSTRACT

An illumination system, including an excitation light source, a beam splitting filter device, and a wavelength conversion element, is provided. The excitation light source is configured to emit an excitation beam. The beam splitting filter device includes a light penetration region and a beam splitting filter region. The excitation beam penetrates the light penetration region to form a first beam. The excitation beam is reflected by the beam splitting filter region. The wavelength conversion element is disposed on a transmission path of the excitation beam coming from the beam splitting filter region. The wavelength conversion element is configured to convert the excitation beam coming from the beam splitting filter region to a conversion beam and transmit the conversion beam back to the beam splitting filter region, and the conversion beam at least partially penetrates the beam splitting filter region to form a second beam. A projection device is also provided.

21 Claims, 20 Drawing Sheets

(51) Int. Cl.
*G02B 26/00* (2006.01)
*G02B 27/14* (2006.01)
*G02B 27/09* (2006.01)
*G02B 27/10* (2006.01)
*G03B 33/12* (2006.01)

(52) U.S. Cl.
CPC ......... *G02B 27/102* (2013.01); *G02B 27/141* (2013.01); *G03B 21/208* (2013.01); *G03B 21/2066* (2013.01); *G03B 33/12* (2013.01)

(56) References Cited

FOREIGN PATENT DOCUMENTS

| CN | 208188567 | 12/2018 |
| CN | 109471318 | 3/2019 |
| CN | 111221211 | 6/2020 |

* cited by examiner

ILLUMINATION SYSTEM AND PROJECTION DEVICE

CROSS-REFERENCE TO RELATED APPLICATION

This application claims the priority benefit of China application serial no. 202011153677.0, filed on Oct. 26, 2020. The entirety of the above-mentioned patent application is hereby incorporated by reference herein and made a part of this specification.

BACKGROUND

Technical Field

This disclosure relates to an optical system and an optical device including the optical system, and in particular to an illumination system and a projection device.

Description of Related Art

A wavelength conversion wheel and a filtering wheel may be included in the structure of a laser projector. The wavelength conversion wheel may have a wavelength conversion region and a non-wavelength conversion region. A blue laser beam may be converted to a conversion beam when the blue laser beam from a light source irradiates the wavelength conversion region. The blue laser beam is outputted from the non-wavelength conversion region when the blue laser beam irradiates the non-wavelength conversion region. Finally, the conversion beam and the blue laser beam are respectively guided to the filter color wheel, and a required color light is respectively filtered out through a corresponding filter region. However, in this structure, the blue laser beam needs to be transmitted to the wavelength conversion wheel first, and then the blue laser beam that does not need to be converted is redirected to the filter color wheel to form the required blue light, causing the optical path of the blue light to be too long, thereby leading to blue light loss.

In order to solve the above issue, a current possible approach is to enable the blue laser beam from the light source to travel through different beam paths at different timings, so that the blue laser beam that does not need to be converted can be directly transmitted to the filter color wheel instead of being transmitted to the wavelength conversion wheel. This shortens the optical path, which reduces the energy loss of the beam during transmission. However, this structure requires disposition of additional beam splitting rotating elements, which may increase the cost and increase the difficulty of synchronous control between the electronic elements.

The information disclosed in this background section is only for enhancement of understanding of the background of the described technology and therefore it may contain information that does not form the prior art that is already known to a person of ordinary skill in the art. Furthermore, the information disclosed in this section does not mean that one or more problems to be resolved by one or more embodiments of the disclosure were acknowledged by a person of ordinary skill in the art.

SUMMARY

The disclosure provides an illumination system and a projection device, which simultaneously helps to reduce costs and simplifies complexity of synchronous control between electronic components.

Other advantages of the disclosure may be further understood from the technical features disclosed in the disclosure.

An embodiment of the disclosure provides an illumination system, including an excitation light source, a beam splitting filter device, and a wavelength conversion element. The excitation light source is configured to emit an excitation beam. The beam splitting filter device includes a light penetration region and a beam splitting filter region. The light penetration region and the beam splitting filter region sequentially cut into a transmission path of the excitation beam. The excitation beam penetrates the light penetration region to form a first beam when the light penetration region cuts into the transmission path of the excitation beam. The excitation beam is reflected by the beam splitting filter region when the beam splitting filter region cuts into the transmission path of the excitation beam. The wavelength conversion element is disposed on a transmission path of the excitation beam coming from the beam splitting filter region. The wavelength conversion element is configured to convert the excitation beam coming from the beam splitting filter region to a conversion beam and transmit the conversion beam back to the beam splitting filter region, and the conversion beam at least partially penetrates the beam splitting filter region to form a second beam.

An embodiment of the disclosure provides a projection device, including the above illumination system, at least one light valve, and a projection lens. The at least one light valve is disposed on transmission paths of a first beam and a second beam, so as to adjust the first beam and the second beam to become an image beam. The projection lens is disposed on a transmission path of the image beam.

Based on the above, in the illumination system and the projection device according to the embodiment of the disclosure, the beam splitting filter device may simultaneously have both beam splitting and light filtering functions. In other words, the beam splitting filter device may not only enables the excitation beam coming from the excitation light source to travel through the different beam paths at the different timings, so that the excitation beam that does not need to be converted is not transmitted to the wavelength conversion element, it may also filters the excitation beam coming from the wavelength conversion element. Therefore, the illumination system and the projection device according to the embodiment can have a simpler structure, without having to dispose two independent optical elements to respectively achieve both the beam splitting and light filtering actions. This helps to reduce costs and simplifies the complexity of synchronous control between the electronic components.

Other objectives, features and advantages of the disclosure can be further understood from the further technological features disclosed by the embodiments of the disclosure wherein there are shown and described preferred embodiments of the disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the descriptions, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top", "bottom", "front", "back" etc., is used with reference to the orientation of the figure(s) being described. The components of the disclosure can be positioned in a number of different orientations. As such, the directional terminology is used for purposes of illustration and is in no way limiting.

On the other hand, the drawings are only schematic and the size of the components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting.

The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings.

Similarly, the terms "facing", "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
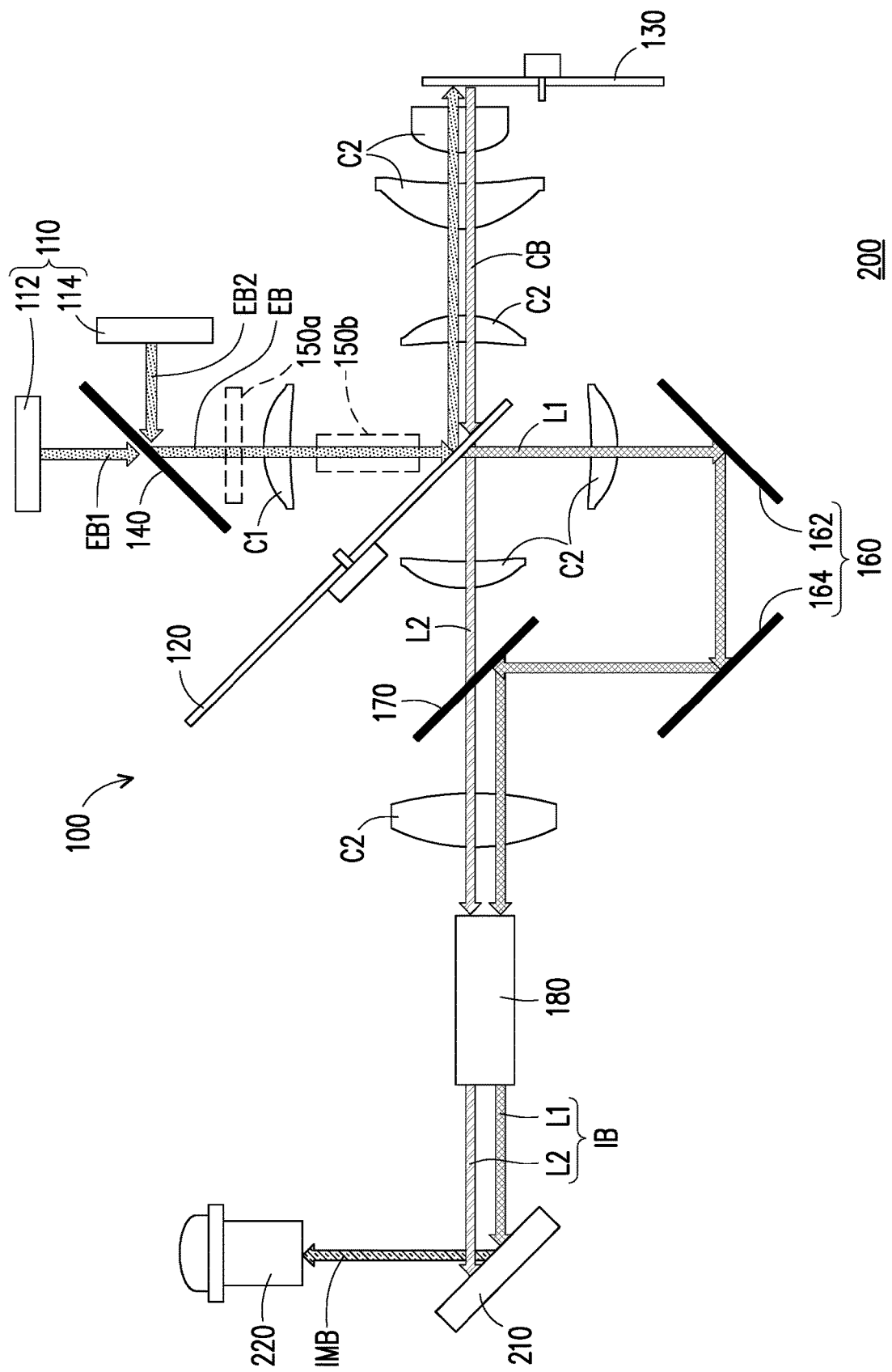
FIG. 1 is a schematic structural view of a projection device according to a first embodiment of the disclosure.
Figure 3:
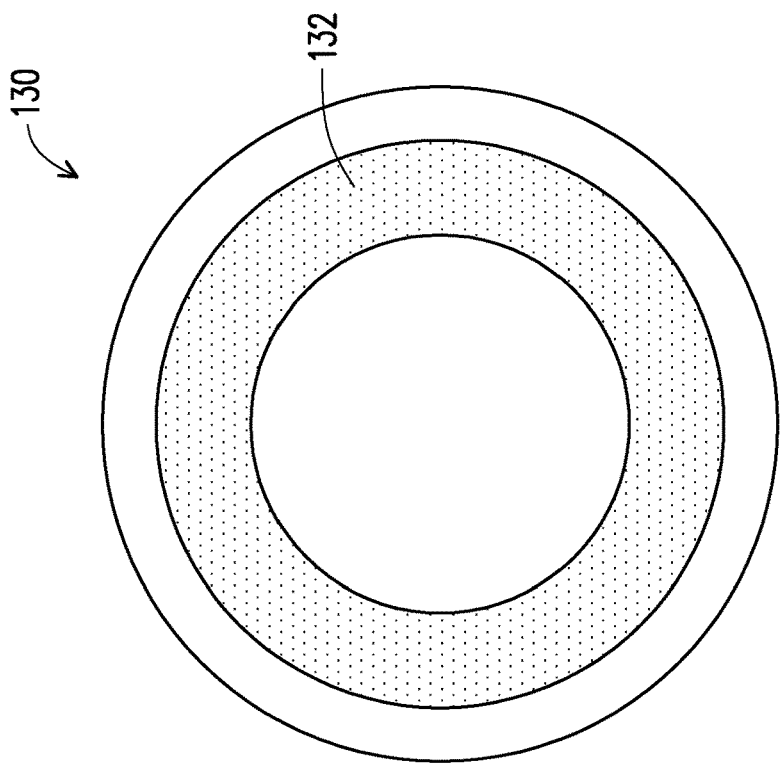
FIGS. 2 and 3 are respectively schematic front views of a beam splitting filter device and a wavelength conversion element according to the first embodiment of the disclosure.
Figure 2:
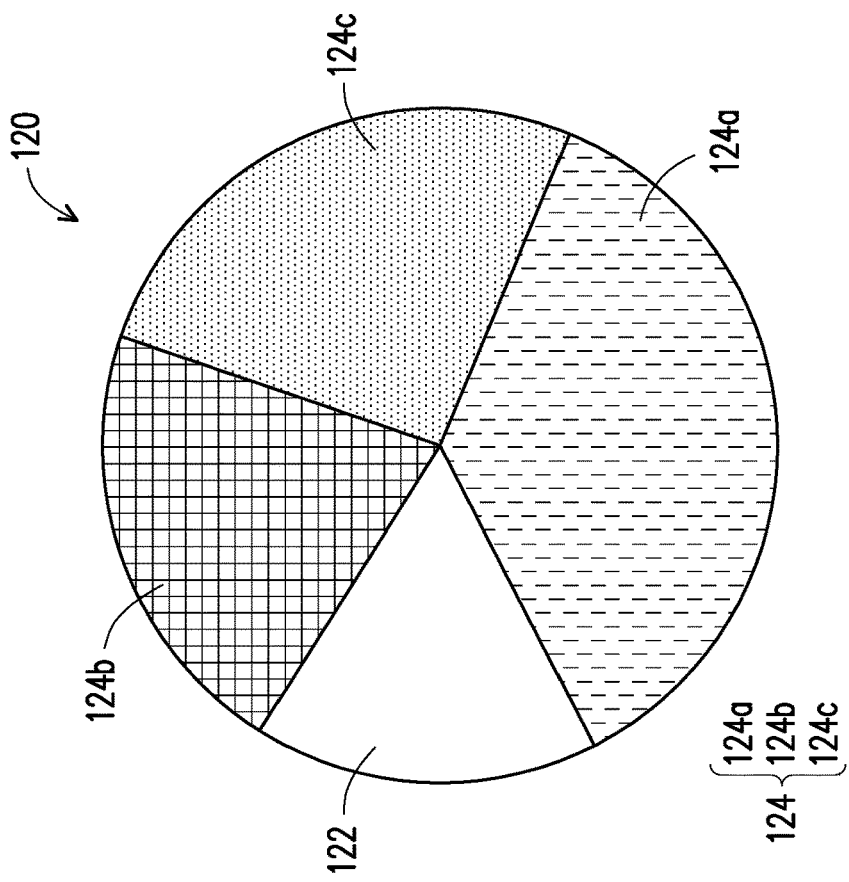

FIG. 1 is a schematic structural view of a projection device according to a first embodiment of the disclosure. FIGS. 2 and 3 are respectively schematic front views of a beam splitting filter device and a wavelength conversion element according to the first embodiment of the disclosure. With reference to FIG. 1 first, a projection device 200 of the embodiment includes an illumination system 100, at least one light valve 210, and a projection lens 220. The illumination system 100 is configured to provide an illumination beam IB. The at least one light valve 210 is disposed on a transmission path of the illumination beam IB to adjust the illumination beam IB to become an image beam IMB. The projection lens 220 is disposed on a transmission path of the image beam IMB, and is configured to project the image beam IMB onto a screen or a wall (not shown) to form an image picture. The at least one light valve 210 converts the illumination beam IB of different colors to the image beam IMB according to different timings and transmits the image beam IMB to the projection lens 220 after the illumination beam IB of different colors irradiates the at least one light valve 210. Therefore, the image beam IMB converted by the at least one light valve 210 forms the image picture that is projected out of the projection device 200, so as to become a color picture.

In the embodiment, the at least one light valve 210 is, for example, a digital micro-mirror device (DMD) or a liquid-crystal-on-silicon panel (LCOS panel). However, in other embodiments, the at least one light valve 210 may also be a transparent liquid crystal panel or other spatial light modulator. In the embodiment, the number of the at least one light valve 210 may be one. However, in other embodiments, the number of the at least one light valve 210 may be more than one. In the embodiment, the projection lens 220 includes, for example, a combination of one or more optical lenses with diopter. The optical lens includes, for example, a non-planar lens such as a biconcave lens, a biconvex lens, a concave-convex lens, a convex-concave lens, a plano-convex lens, a plano-concave lens, or various combinations thereof. The disclosure does not limit the form and type of the projection lens 220.

With reference to FIGS. 1 to 3, the illumination system 100 includes an excitation light source 110, a beam splitting filter device 120, and a wavelength conversion element 130. The excitation light source 110 is configured to emit an excitation beam EB. The beam splitting filter device 120 includes a light penetration region 122 and a beam splitting filter region 124. The light penetration region 122 and the beam splitting filter region 124 sequentially cut into a transmission path of the excitation beam EB. The excitation beam EB penetrates the light penetration region 122 to form a first beam L1 when the light penetration region 122 cuts into the transmission path of the excitation beam EB. The excitation beam EB is reflected by the beam splitting filter region 124 when the beam splitting filter region 124 cuts into the transmission path of the excitation beam EB. The wavelength conversion element 130 is disposed on a transmission path of the excitation beam EB coming from the beam splitting filter region 124. The wavelength conversion element 130 is configured to convert the excitation beam EB coming from the beam splitting filter region 124 to a conversion beam CB and transmitting the conversion beam CB back to the beam splitting filter region 124, and the conversion beam CB at least partially penetrates the beam splitting filter region 124 to form a second beam L2.

The excitation light source 110 may include a laser diode (LD), a light-emitting diode (LED), or an array or group constituted of one of the two, but the disclosure is not limited thereto. In the embodiment, the excitation light source 110 is a laser light-emitting element including a laser diode. In addition, the excitation light source 110 may include multiple sub-excitation light sources, so that the excitation beam EB includes multiple sub-excitation beams. For example, the excitation light source 110 may include a sub-excitation light source 112 and a sub-excitation light source 114. The sub-excitation light source 112 is configured to emit a sub-excitation beam EB1, and the sub-excitation light source 114 is configured to emit a sub-excitation beam EB2. The excitation beam EB includes the sub-excitation beam EB1 and the sub-excitation beam EB2. In the embodiment, the sub-excitation light source 112 and the sub-excitation light source 114 may include a blue laser diode bank, and the sub-excitation beam EB1 and the sub-excitation beam EB2 include a blue laser beam, but the disclosure is not limited thereto.

The sub-excitation beam EB1 and the sub-excitation beam EB2 may be combined to become the excitation beam EB through a beam combining element 140. In detail, the beam combining element 140 may have multiple penetrating parts and multiple reflecting parts arranged alternately. The penetrating parts and the reflecting parts are respectively disposed on transmission paths of the sub-excitation beam EB1 and the sub-excitation beam EB2, so that the sub-excitation beam EB1 penetrates and the sub-excitation beam EB2 is reflected. Therefore, the beam combining element 140 may combine the sub-excitation beam EB1 coming from the sub-excitation light source 112 and the sub-excitation beam EB2 coming from the sub-excitation light source 114 and transmit them to the beam splitting filter device 120. It should be noted that the number of the sub-excitation light sources in FIG. 1 is only an illustrative example, and the excitation light source 110 may include more or less number of the sub-excitation light sources. For example, in other embodiments, the sub-excitation light source 114 may be omitted. In this case, the beam combining element 140 may also be omitted.

In the embodiment, the wavelength conversion element 130 may be a rotating member, and the wavelength conversion element 130 includes a wavelength conversion region 132. The wavelength conversion region 132 has a wavelength conversion substance to convert the excitation beam EB to the conversion beam CB. In the embodiment, the wavelength conversion region 132 is shaped as a ring and has the same wavelength conversion material, therefore the conversion beam CB may have the same wavelength range at the different timings. The wavelength conversion region 132 may, for example, enable the excitation beam EB to be converted a yellow-green beam, but is not limited thereto. Since the wavelength conversion region 132 is shaped as a complete ring, there is no need to control the timing of the wavelength conversion element 130, which simplifies the complexity of synchronous control between electronic components. Here, the wavelength conversion element 130 is, for example, a reflective element, so the wavelength conversion element 130 may transmit the conversion beam CB back to the beam splitting filter device 120.

In the embodiment, the beam splitting filter device 120 may be a rotating member, and disposition of the light penetration region 122 and the beam splitting filter region 124 of the beam splitting filter device 120 is in a ring shape. An area of the light penetration region 122 may be smaller than an area of the beam splitting filter region 124, but is not limited thereto. The excitation beam EB coming from the excitation light source 110 may sequentially irradiate the light penetration region 122 and the beam splitting filter region 124 of the beam splitting filter device 120 when the beam splitting filter device 120 rotates. The light penetration region 122 may allow the excitation beam EB to pass through, and the light penetration region 122 may be disposed with a diffuser, diffusion particles or a diffusion structure to reduce or eliminate the speckle phenomenon of the excitation beam EB, so as to form and output the first beam L1.

The beam splitting filter region 124 may be designed to reflect the excitation beam EB and allow the conversion beam CB to at least partially pass through to achieve both beam splitting and light filtering actions. In the embodiment, the beam splitting filter region 124 may include multiple beam splitting filter sub-regions that are different from each other. For example, the beam splitting filter region 124 may include a beam splitting filter sub-region 124a, a beam splitting filter sub-region 124b, and a beam splitting filter sub-region 124c. The beam splitting filter sub-region 124a, the beam splitting filter sub-region 124b, and the beam splitting filter sub-region 124c may respectively be dichroic units, such as a dichroic mirror (DM), and may provide different optical actions to beams of different colors/wavelengths. For example, the beam splitting filter sub-region 124a may be designed to reflect the excitation beam EB, filter out beams in the conversion beam CB other than a beam in the green wavelength range, and enabling the beam in the green wavelength range to pass through. The beam splitting filter sub-region 124b may be designed to reflect the excitation beam EB, filter out the beams in the conversion beam CB other than a beam in the red wavelength range, and enabling the beam in the red wavelength range to pass through. In addition, the beam splitting filter sub-region 124c may be designed to reflect the excitation beam EB and filter out the beams in the conversion beam CB other than a beam in the yellow wavelength range, and enabling the beam in the yellow wavelength range to pass through.

Therefore, the beam splitting filter sub-region 124a, the beam splitting filter sub-region 124b, and the beam splitting filter sub-region 124c may transmit the excitation beam EB coming from the excitation light source 110 to the wavelength conversion region 132 of the wavelength conversion element 130. In addition, the second beam L2 formed after the conversion beam CB coming from the wavelength conversion element 130 sequentially irradiates the beam splitting filter sub-region 124a, the beam splitting filter sub-region 124b, and the beam splitting filter sub-region 124c may have different wavelength ranges at the different timings.

The beam splitting filter device 120 may simultaneously have both beam splitting and light filtering functions. In other words, the beam splitting filter device 120 may not only enables the excitation beam EB coming from the excitation light source 110 to travel through different beam paths at the different timings, so that the excitation beam EB that does not need to be converted is not transmitted to the wavelength conversion element 130, it may also filters the conversion beam CB coming from the wavelength conversion element 130. Therefore, it can have a simpler structure without having to dispose two independent optical elements to respectively achieve both the beam splitting and light filtering actions. This simultaneously helps to reduce costs and simplifies the complexity of synchronous control between the electronic components.

In the embodiment, the beam splitting filter device 120 is inclined with respect to a traveling direction of the excitation beam EB, therefore the excitation beam EB is incident on the beam splitting filter device 120 obliquely.

As shown in FIG. 1, the illumination system 100 further includes a light beam shaping element (such as a light beam shaping element 150a or a light beam shaping element 150b in FIG. 1). The light beam shaping element is disposed between the excitation light source 110 and the beam splitting filter device 120, and is configured to adjust a light beam shape or a light beam energy distribution of the excitation beam EB. For example, the light beam shaping element may enable an aspect ratio of the light spot of the excitation beam EB to be better matched with an aspect ratio of an effective region of the light valve 210, so as to improve the light utilization efficiency. Alternatively, the light beam shaping element may enable the light beam energy distribution of the excitation beam EB to be uniform, instead of being excessively concentrated in the center, so as to improve the conversion efficiency of the wavelength conversion element 130. In some embodiments, the illumination system 100 may include the light beam shaping element 150a. The light beam shaping element 150a is, for example, a lens array or a diffusion element, and the light beam shaping element 150a may be disposed between the excitation light source 110 and a focusing lens C1. In some embodiments, the illumination system 100 may include the light beam shaping element 150b. The light beam shaping element 150b is, for example, a light integration rod, and the light beam shaping element 150b may be disposed between the focusing lens C1 and the beam splitting filter device 120.

In addition, the illumination system 100 further includes a light transmission module 160, a beam combining element 170, a homogenizing element 180, and multiple lenses C2. The light transmission module 160 is disposed on a transmission path of the first beam L1 coming from the beam splitting filter device 120, and may include a light transmission element 162 and a light transmission element 164, so as to transmit the first beam L1 coming from the beam splitting filter device 120 to the beam combining element 170. The light transmission element 162 and the light transmission element 164 are, for example, reflecting mirrors. The beam combining element 170 is disposed on transmission paths of the first beam L1 coming from the light transmission module 160 and the second beam L2 coming from the beam splitting filter device 120. In the embodiment, the second beam L2 is transmitted from the beam splitting filter device 120 to the beam combining element 170 along the same traveling direction. Specifically, the beam combining element 170 may be a dichroic unit, such as a dichroic mirror (DM) or a dichroic prism, and may provide different optical actions to the beams of different colors. In the embodiment, the beam combining element 170 may be designed to reflect the first beam L1 while allowing the second beam L2 to penetrate, so as to transmit the first beam L1 coming from the light transmission module 160 and the second beam L2 coming from the beam splitting filter device 120 to the homogenizing element 180. The homogenizing element 180 is disposed on a transmission path of the first beam L1 and the second beam L2 coming from the beam combining element 170, and is configured to homogenize the first beam L1 and the second beam L2, so as to form the illumination beam IB. The homogenizing element 180 is, for example, a light integration rod, but is not limited thereto. The multiple lenses C2 are configured to adjust the beam inside the illumination system 100.

Figure 4:
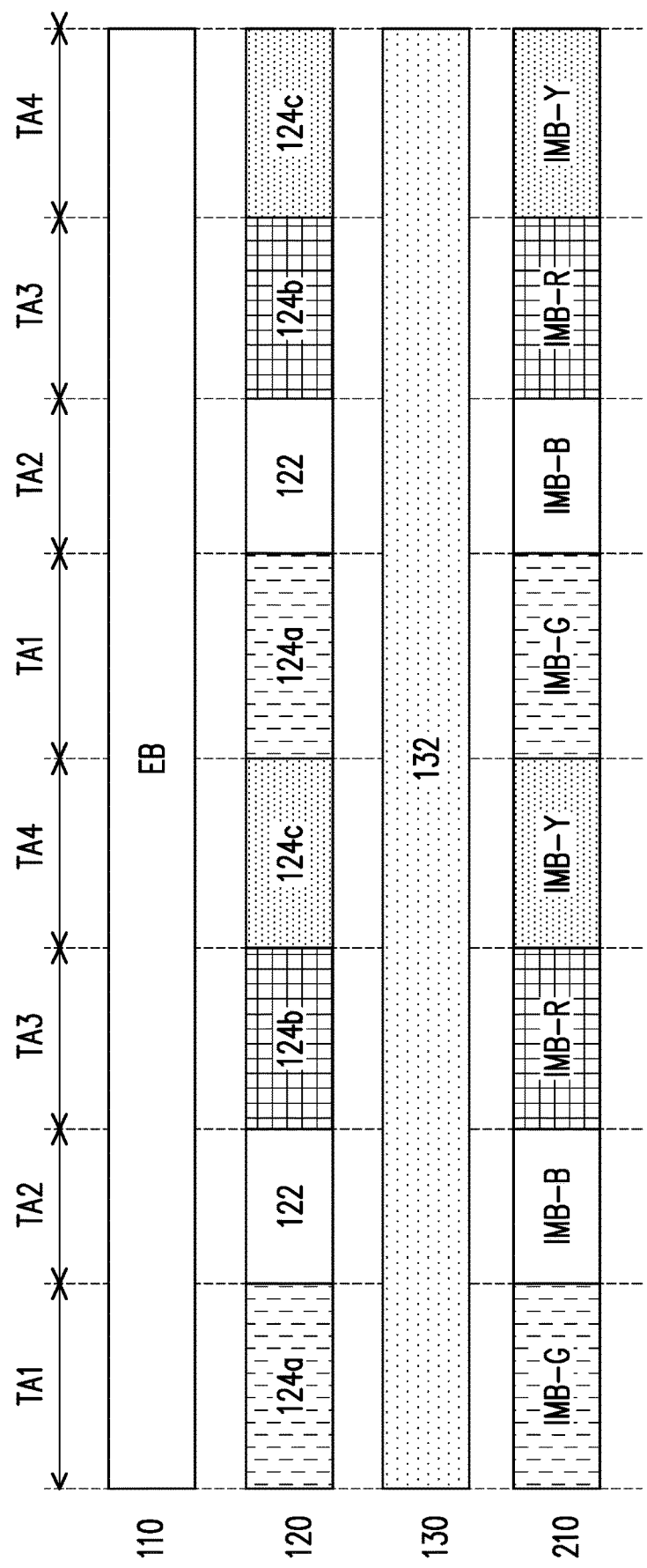
FIG. 4 is a schematic view of an operation mode according to the first embodiment of the disclosure.

FIG. 4 is a schematic view of an operation mode according to the first embodiment of the disclosure. Hereinafter, in conjunction with FIGS. 1 to 4, an example is described to illustrate a process of the projection device 200 providing a projection picture when the number of the at least one light valve 210 is one. The projection device 200 of the embodiment has, for example, a first timing TA1, a second timing TA2, a third timing TA3, and a fourth timing TA4, and the excitation light source 110 is continuously switched on in the above timings to emit the excitation beam EB (such as a blue light).

In the first timing TA1, the beam splitting filter sub-region 124a of the beam splitting filter device 120 reflects the excitation beam EB coming from the excitation light source 110 to the wavelength conversion region 132 of the wavelength conversion element 130, the wavelength conversion region 132 of the wavelength conversion element 130 converts the excitation beam EB coming from the beam splitting filter device 120 to the conversion beam CB (such as a yellow-green light), and then transmit the conversion beam CB back to the beam splitting filter sub-region 124a of the beam splitting filter device 120, and the conversion beam CB coming from the wavelength conversion element 130 at least partially penetrates the beam splitting filter sub-region 124a, so as to form the second beam L2 (such as a green light). The light valve 210 is switched to a first state in the first timing TA1, so as to convert the second beam L2 to a green image beam IMB-G. The green image beam IMB-G is projected by the projection lens 220 to a projection target (such as a screen, or a wall) to form a green picture.

In the second timing TA2, the excitation beam EB coming from the excitation light source 110 penetrates the light penetration region 122 of the beam splitting filter device 120, so as to form the first beam L1 (such as the blue light). The light valve 210 is switched to a second state in the second timing TA2, so as to convert the first beam L1 to a blue image beam IMB-B. The blue image beam IMB-B is projected by the projection lens 220 to the projection target (such as the screen, or the wall) to form a blue picture.

In the third timing TA3, the beam splitting filter sub-region 124b of the beam splitting filter device 120 reflects the excitation beam EB coming from the excitation light source 110 to the wavelength conversion region 132 of the wavelength conversion element 130, the wavelength conversion region 132 of the wavelength conversion element 130 converts the excitation beam EB coming from the beam splitting filter device 120 to the conversion beam CB (such as the yellow-green light), and then transmit the conversion beam CB back to the beam splitting filter sub-region 124b of the beam splitting filter device 120, and the conversion beam CB coming from the wavelength conversion element 130 at least partially penetrates the beam splitting filter sub-region 124b, so as to form the second beam L2 (such as a red light).

The light valve 210 is switched to a third state in the third timing TA3, so as to convert the second beam L2 to a red image beam IMB-R. The red image beam IMB-R is projected by the projection lens 220 to the projection target (such as the screen, or the wall) to form a red picture.

In the fourth timing TA4, the beam splitting filter sub-region 124c of the beam splitting filter device 120 reflects the excitation beam EB coming from the excitation light source 110 to the wavelength conversion region 132 of the wavelength conversion element 130, the wavelength conversion region 132 of the wavelength conversion element 130 converts the excitation beam EB coming from the beam splitting filter device 120 to the conversion beam CB (such as the yellow-green light), and then transmit the conversion beam CB back to the beam splitting filter sub-region 124c of the beam splitting filter device 120, and the conversion beam CB coming from the wavelength conversion element 130 at least partially penetrates the beam splitting filter sub-region 124c, so as to form the second beam L2 (such as a yellow light). The light valve 210 is switched to a fourth state in the fourth timing TA4, so as to convert the second beam L2 to a yellow image beam IMB-Y. The yellow image beam IMB-Y is projected by the projection lens 220 to the projection target (such as the screen, or the wall) to form a yellow picture.

As described above, the projection device 200 projects the green image beam IMB-G in the first timing TA1, projects the blue image beam IMB-B in the second timing TA2, projects the red image beam IMB-R in the third timing TA3, and projects the yellow image beam IMB-Y in the fourth timing TA4 to the projection target (such as the screen or the wall). The green, blue, red and yellow pictures formed may compose a needed color projection picture by using visual persistence of the human eye. That is, the image beam IMB formed by the light valve 210 according to the timings includes the green image beam IMB-G, the blue image beam IMB-B, the red image beam IMB-R and the yellow image beam IMB-Y, and the image beam IMB is being transmitted to the projection lens 220 and projected out of the projection device 200, so as to form the color picture.

It must be noted here that the following embodiments continue to use some of the content of the foregoing embodiments, and description of the same technical content is omitted. Reference may be made to some of the content of the foregoing embodiments for the same element names or reference numerals, which will not be reiterated in the following embodiments.

Figure 5:
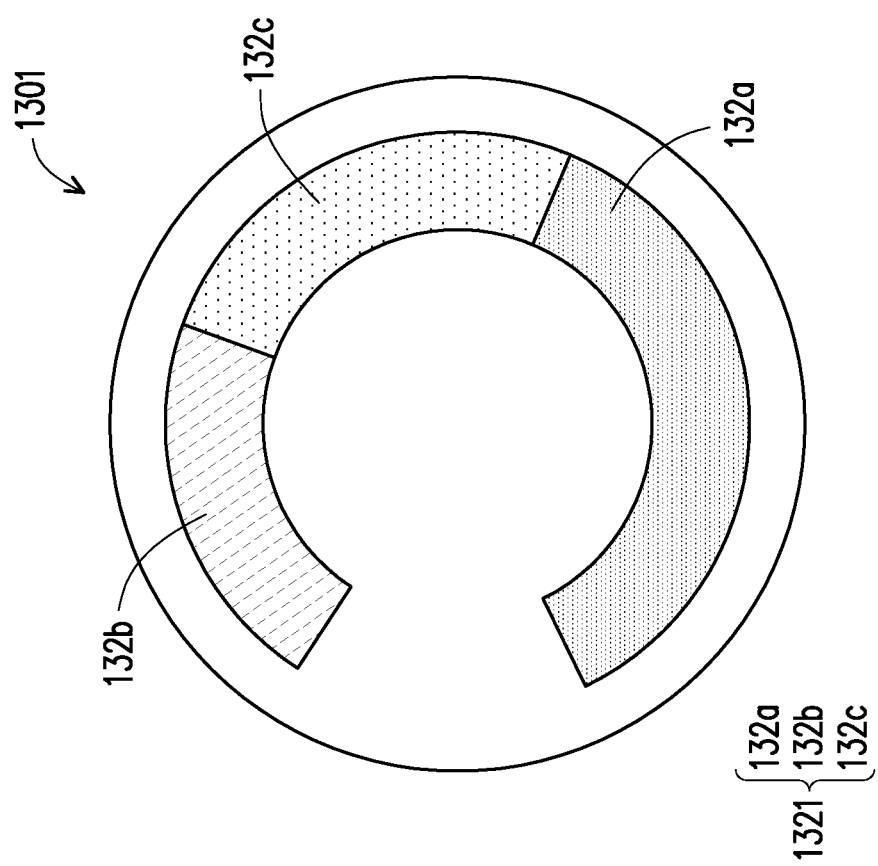
FIG. 5 is a schematic front view of another wavelength conversion element according to the first embodiment of the disclosure.

FIG. 5 is a schematic front view of another wavelength conversion element according to the first embodiment of the disclosure. With reference to FIGS. 1, 2 and 5, a wavelength conversion element 1301 of the embodiment is similar to the wavelength conversion element 130 in FIG. 3. The main difference is that a wavelength conversion region 1321 of the wavelength conversion element 1301 according to the embodiment includes multiple different wavelength conversion sub-regions. For example, the wavelength conversion element 1301 may include a wavelength conversion sub-region 132a, a wavelength conversion sub-region 132b, and a wavelength conversion sub-region 132c. The wavelength conversion sub-region 132a, the wavelength conversion sub-region 132b, and the wavelength conversion sub-region 132c may respectively have different wavelength conversion substances, enabling the conversion beam CB to have different wavelength ranges at the different timings. The wavelength conversion sub-region 132a may, for example, convert the excitation beam EB to a green beam, the wavelength conversion sub-region 132b may, for example, convert the excitation beam EB to a red beam, and the wavelength conversion sub-region 132c may, for example, convert the excitation beam EB to a yellow beam, but is not limited thereto.

In the embodiment, the wavelength conversion sub-region 132a, the wavelength conversion sub-region 132b, and the wavelength conversion sub-region 132c of the wavelength conversion element 1301 respectively correspond to the beam splitting filter sub-region 124a, the beam splitting filter sub-region 124b, and the beam splitting filter sub-region 124c of the beam splitting filter device 120. In other words, the conversion beam CB (such as the green light) coming from the wavelength conversion sub-region 132a may irradiate the beam splitting filter sub-region 124a, the conversion beam CB (such as the red light) coming from the wavelength conversion sub-region 132b may irradiate the beam splitting filter sub-region 124b, and the conversion beam CB (such as the yellow light) coming from the wavelength conversion sub-region 132c may irradiate the beam splitting filter sub-region 124c.

It should be noted that, in other embodiments, at least two of the multiple wavelength conversion sub-regions may also have the same wavelength conversion substance. For example, the wavelength conversion sub-region 132b and the wavelength conversion sub-region 132c may have the same wavelength conversion substance. The wavelength conversion sub-region 132b and the wavelength conversion sub-region 132c may, for example, convert the excitation beam EB to the yellow beam, while the conversion beam CB (such as the yellow light) coming from the wavelength conversion sub-region 132b and the wavelength conversion sub-region 132c may still form the second beam L2 with the different wavelength ranges at the different timings through the beam splitting filter sub-region 124b and the beam splitting filter sub-region 124c.

Figure 6:
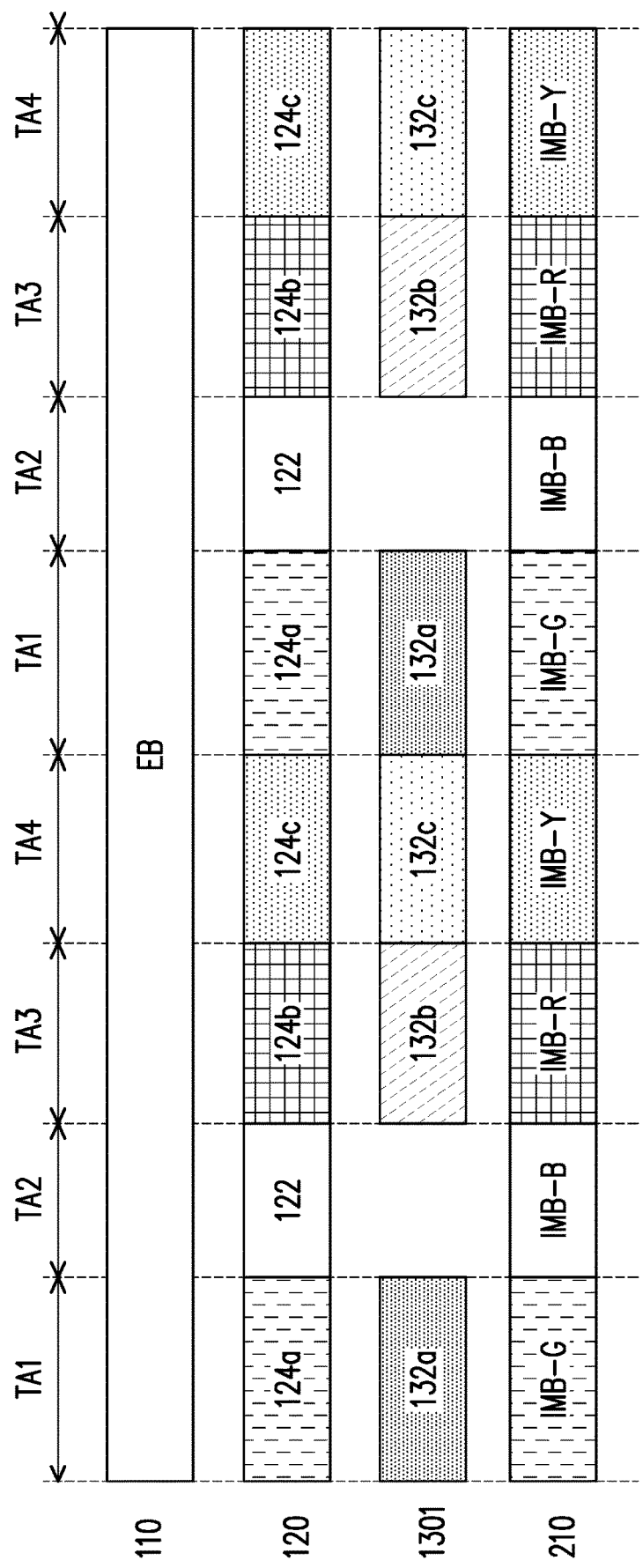
FIG. 6 is a schematic view of another operation mode according to the first embodiment of the disclosure.

FIG. 6 is a schematic view of another operation mode according to the first embodiment of the disclosure. Hereinafter, in conjunction with FIGS. 1, 2, 5, and 6, an example is described to illustrate the process of the projection device 200 providing the projection picture when the number of the at least one light valve 210 is one.

An operation mode of FIG. 6 is similar to the operation mode of FIG. 4. The main difference is that in the embodiment, in the first timing TA1, the beam splitting filter sub-region 124a of the beam splitting filter device 120 reflects the excitation beam EB coming from the excitation light source 110 to the wavelength conversion sub-region 132a of the wavelength conversion element 1301, the wavelength conversion sub-region 132a of the wavelength conversion element 1301 converts the excitation beam EB coming from the beam splitting filter device 120 to the conversion beam CB (such as the green light), and then transmits the conversion beam CB back to the beam splitting filter sub-region 124a of the beam splitting filter device 120; in the third timing TA3, the beam splitting filter sub-region 124b of the beam splitting filter device 120 reflects the excitation beam EB coming from the excitation light source 110 to the wavelength conversion sub-region 132b of the wavelength conversion element 1301, the wavelength conversion sub-region 132b of the wavelength conversion element 1301 converts the excitation beam EB coming from the beam splitting filter device 120 to the conversion beam CB (such as the red light), and then transmits the conversion beam CB back to the beam splitting filter sub-region 124b of the beam splitting filter device 120; and in the fourth timing TA4, the beam splitting filter sub-region 124c of the beam splitting filter device 120 reflects the excitation beam EB coming from the excitation light source 110 to the wavelength conversion sub-region 132c of the wavelength conversion element 1301, the wavelength conversion sub-region 132c of the wavelength conversion element 1301 converts the excitation beam EB coming from the beam splitting filter device 120 to the conversion beam CB (such as the yellow light), and then transmits the conversion beam CB back to the beam splitting filter sub-region 124c of the beam splitting filter device 120.

Figure 7:
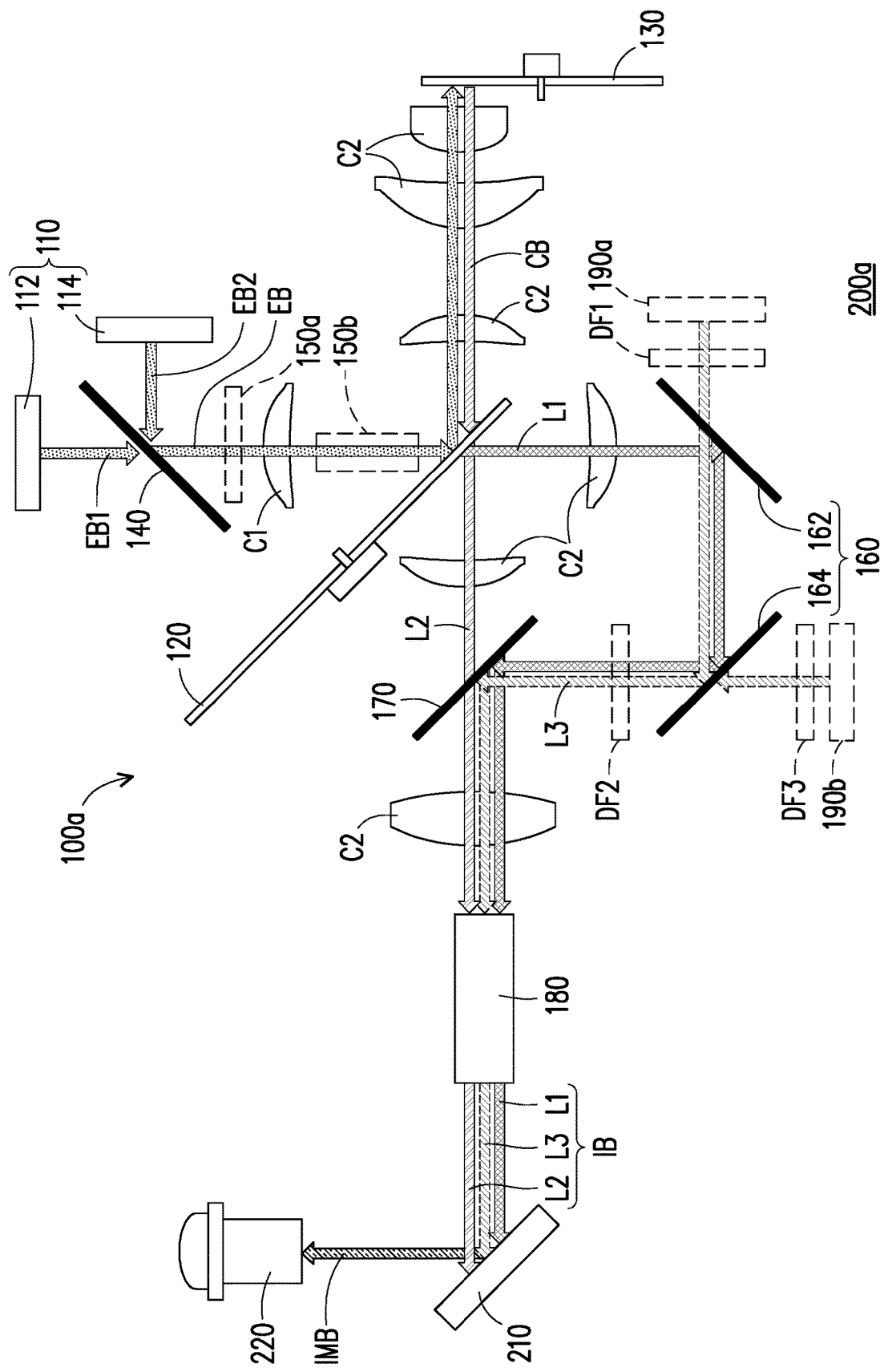
FIG. 7 is a schematic structural view of a projection device according to a second embodiment of the disclosure.

FIG. 7 is a schematic structural view of a projection device according to a second embodiment of the disclosure. With reference to FIG. 7, a projection device 200a of the embodiment is similar to the projection device 200 in FIG. 1. The main difference is that an illumination system 100a of the projection device 200a of the embodiment further includes a supplementary light source (such as a supplementary light source 190a, or a supplementary light source 190b in FIG. 7). The supplementary light source is configured to emit a supplementary beam L3, and the beam combining element 170 is also disposed on a transmission path of the supplementary beam L3 to transmit the supplementary beam L3 to the homogenizing element 180. In the embodiment, the supplementary light source may include a red laser diode bank, and the supplementary light source includes a red laser beam, but the disclosure is not limited thereto. In addition, the illumination system 100a may further include a diffusion element (such as a diffusion element DF1, a diffusion element DF2, or a diffusion element DF3 in FIG. 7), which is disposed on the transmission path of the supplementary beam L3, and is configured to reduce or eliminate the speckle phenomenon of the supplementary beam L3.

It should be noted that multiple supplementary light sources and multiple diffusion elements shown in FIG. 7 are only to illustrate possible positions of the above-mentioned elements, rather than simultaneously disposing the multiple supplementary light sources and the multiple diffusion elements. That is, only one of the supplementary light source 190a and the supplementary light source 190b, and a corresponding diffusion element may be disposed.

In some embodiments, the illumination system 100a may include the supplementary light source 190a, and the supplementary light source 190a emits the supplementary beam L3 to the light transmission element 162. The light transmission element 162 allows the supplementary beam L3 to pass through and transmits the supplementary beam L3 to the light transmission element 164. The light transmission element 164 reflects the supplementary beam L3 to the beam combining element 170. The beam combining element 170 may also be designed to reflect the supplementary beam L3 and transmits the supplementary beam L3 to the homogenizing element 180 to form the illumination beam IB. The light transmission element 162 is, for example, a dichroic unit configured to allow the supplementary beam L3 to pass through and reflect the first beam L1. The light transmission element 164 is, for example, a reflector, but in other embodiments that use the supplementary light source 190a, the light transmission element 164 may also be a dichroic unit with a function of reflecting the supplementary beam L3 and reflecting the first beam L1. In these embodiments, the illumination system 100a may include the diffusion element DF1 located between the supplementary light source 190a and the light transmission element 162, or the diffusion element DF2 located between the light transmission element 164 and the beam combining element 170.

Figure 8:
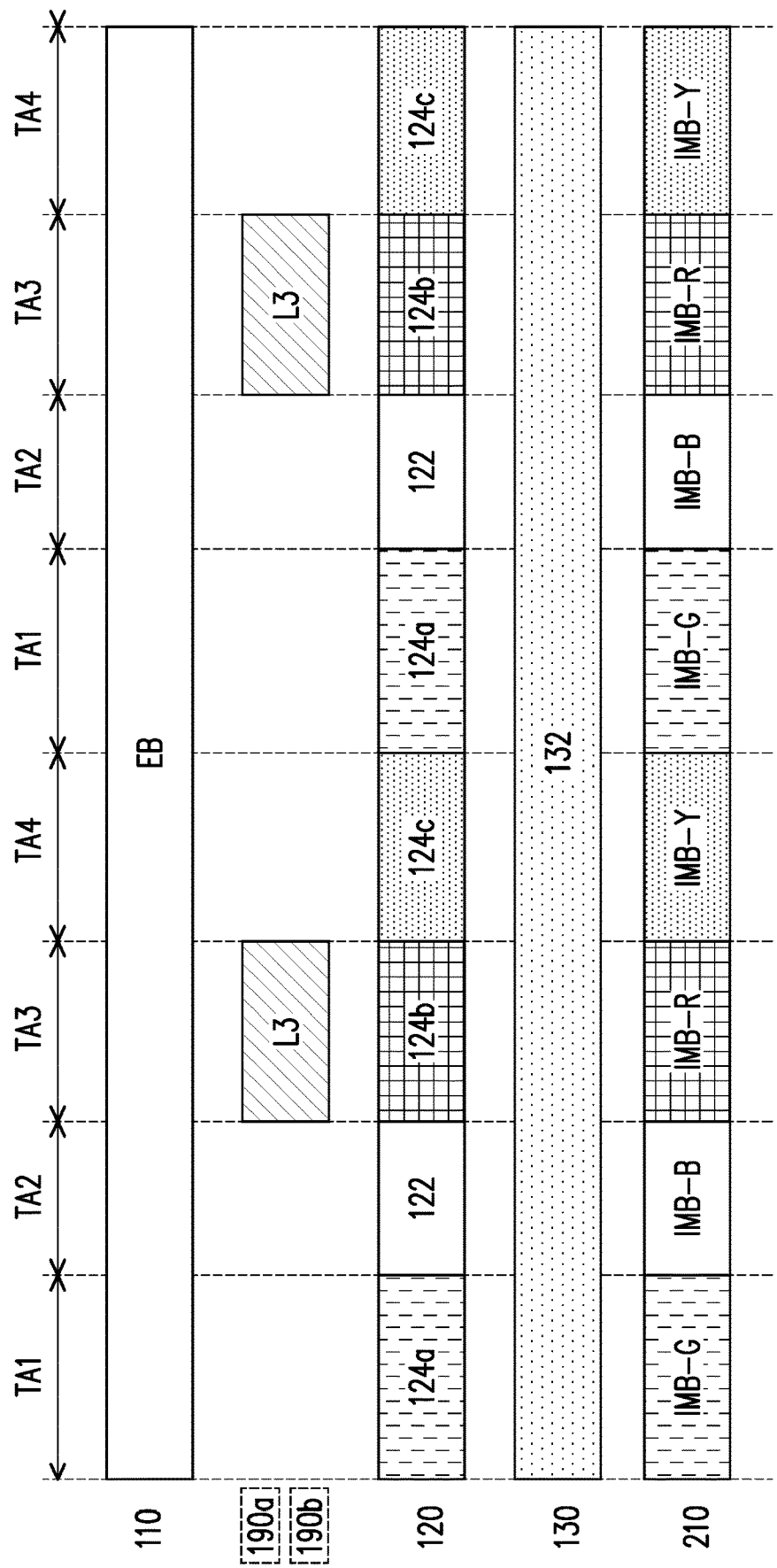
FIG. 8 is a schematic view of an operation mode according to the second embodiment of the disclosure.

FIG. 8 is a schematic view of an operation mode according to the second embodiment of the disclosure. The projection device 200a of the embodiment may cooperate with the beam splitting filter device 120 in FIG. 2 and the wavelength conversion element 130 in FIG. 3. Hereinafter, in conjunction with FIGS. 7, 2, 3, and 8, an example is described to illustrate a process of the projection device 200a providing the projection picture when the number of the at least one light valve 210 is one.

An operation mode of FIG. 8 is similar to the operation mode of FIG. 4. The main difference is that the projection device 200a of the embodiment switches off the supplementary light source (such as the supplementary light source 190a, or the supplementary light source 190b in FIG. 7) in the first timing TA1, the second timing TA2, and the fourth timing TA4, and switches on the supplementary light source in the third timing TA3 to emit the supplementary beam L3 (such as the red light). The light valve 210 converts the second beam L2 and the supplementary beam L3 to the red image beam IMB-R in the third timing TA3.

Figure 9:
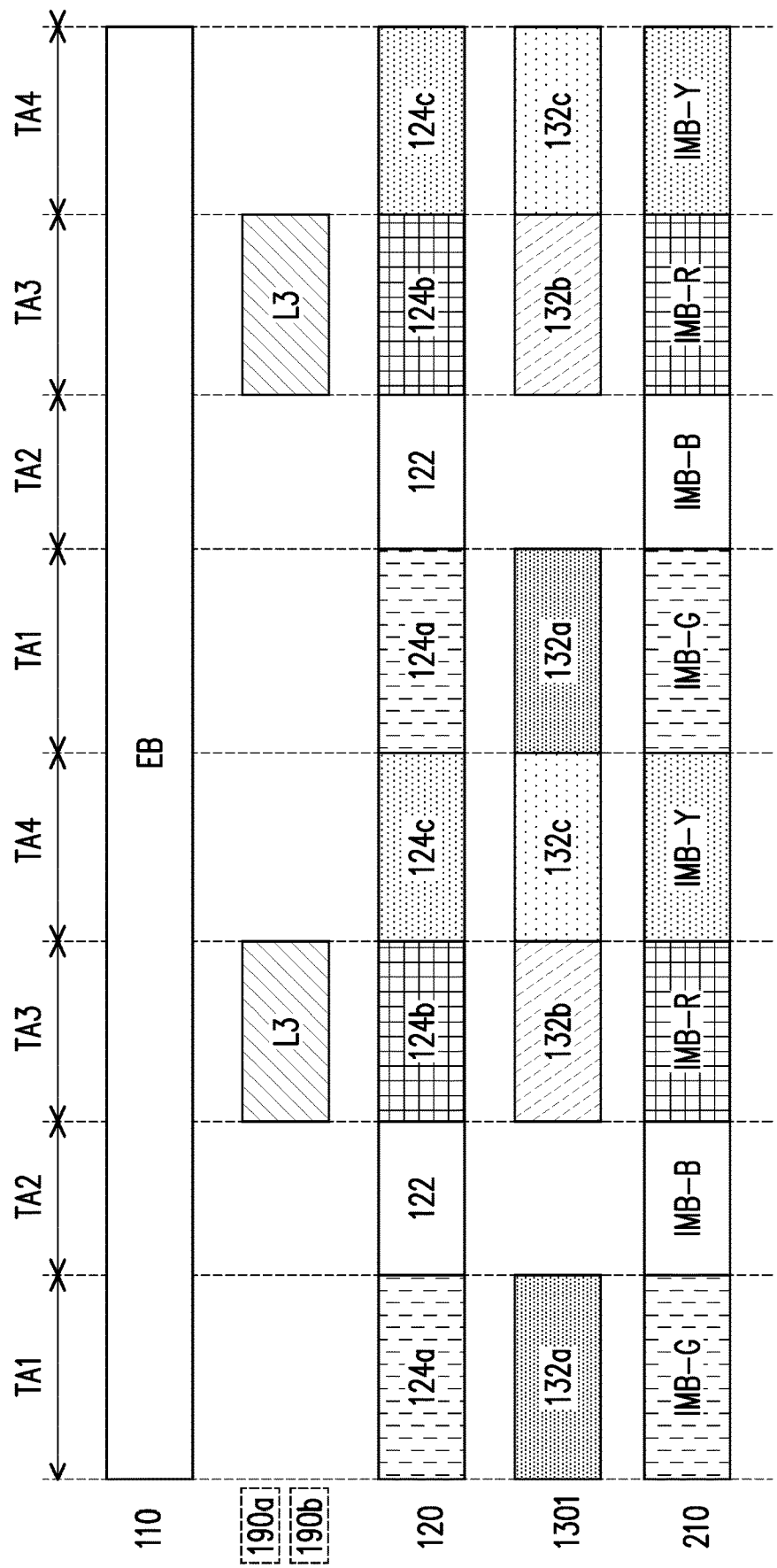
FIG. 9 is a schematic view of another operation mode according to the second embodiment of the disclosure.

FIG. 9 is a schematic view of another operation mode according to the second embodiment of the disclosure. The projection device 200a of the embodiment may cooperate with the beam splitting filter device 120 in FIG. 2 and the wavelength conversion element 1301 in FIG. 5. Hereinafter, in conjunction with FIGS. 7, 2, 5, and 9, an example is described to illustrate the process of the projection device 200a providing the projection picture when the number of the at least one light valve 210 is one.

An operation mode of FIG. 9 is similar to the operation mode of FIG. 6. The main difference is that the projection device 200a of the embodiment switches off the supplementary light source (such as the supplementary light source 190a, or the supplementary light source 190b in FIG. 7) in the first timing TA1, the second timing TA2, and the fourth timing TA4, and switches on the supplementary light source in the third timing TA3 to emit the supplementary beam L3 (such as the red light). The light valve 210 converts the second beam L2 and the supplementary beam L3 to the red image beam IMB-R in the third timing TA3.

Figure 10:
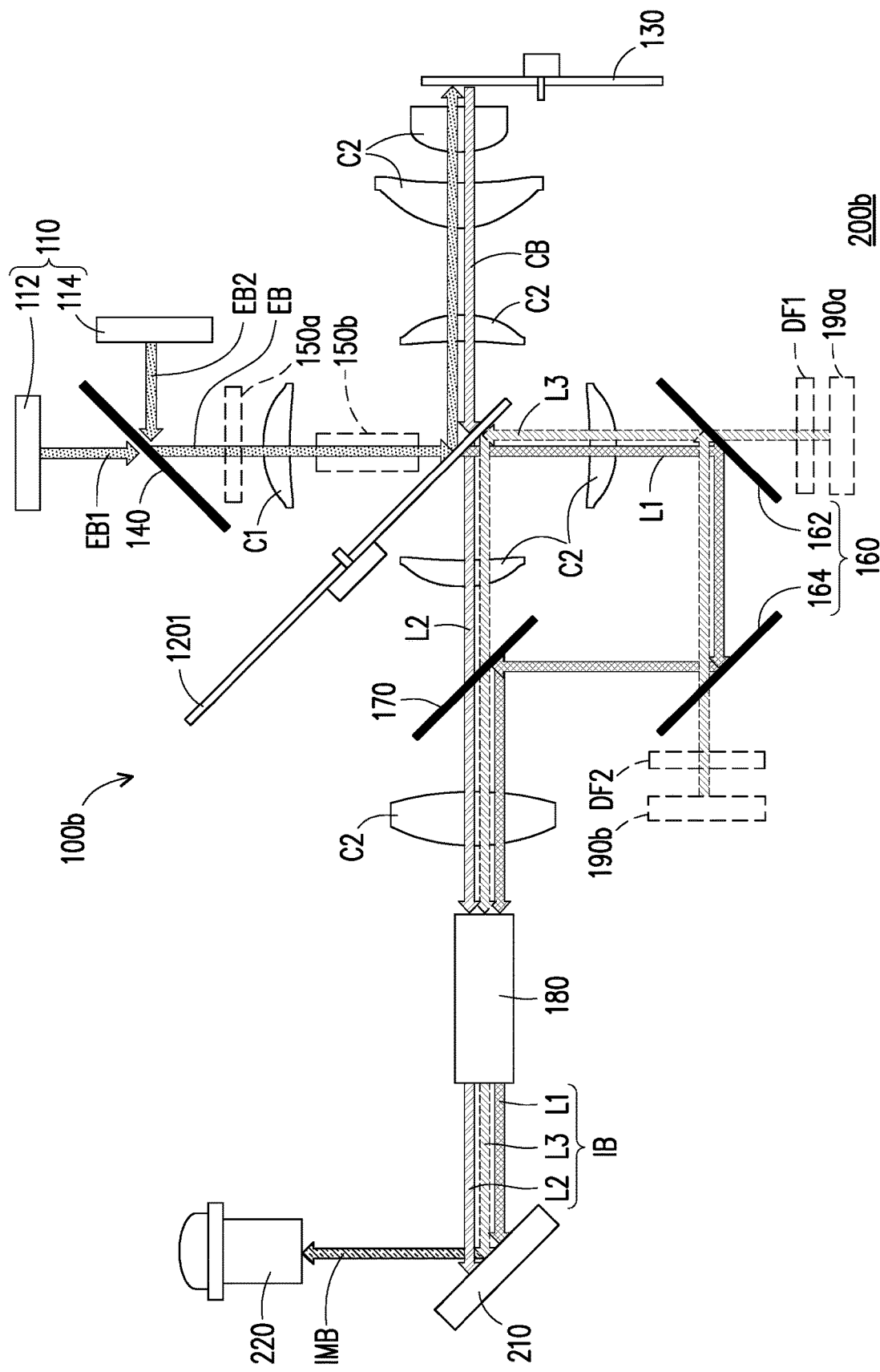
FIG. 10 is a schematic structural view of a projection device according to a third embodiment of the disclosure.
Figure 11:
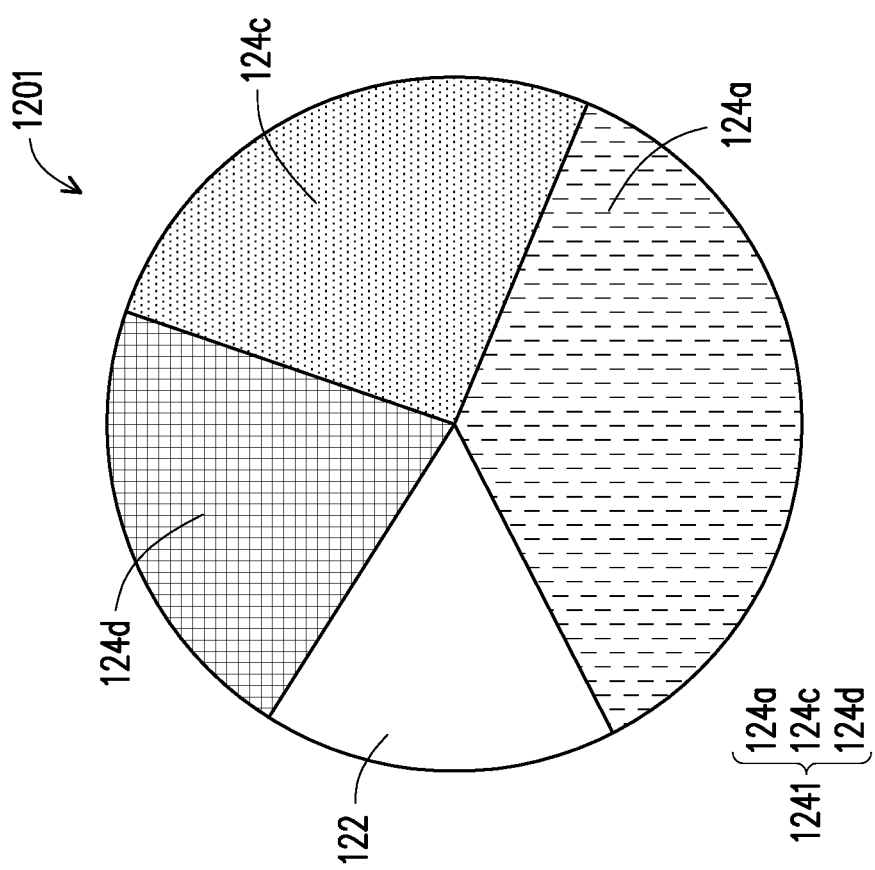
FIG. 11 is a schematic front view of a beam splitting filter device according to the third embodiment of the disclosure.

FIG. 10 is a schematic structural view of a projection device according to a third embodiment of the disclosure. FIG. 11 is a schematic front view of a beam splitting filter device according to the third embodiment of the disclosure. With reference to FIGS. 10 and 11, a projection device 200b of the embodiment is similar to the projection device 200 in FIG. 1. The main difference is that an illumination system 100b of the projection device 200b of the embodiment further includes the supplementary light source (such as the supplementary light source 190a, or the supplementary light source 190b in FIG. 10). The supplementary light source is configured to emit the supplementary beam L3, and the beam combining element 170 is also disposed on the transmission path of the supplementary beam L3 to transmit the supplementary beam L3 to the homogenizing element 180. In the embodiment, the supplementary light source may include the red laser diode bank, and the supplementary beam L3 includes the red laser beam, but the disclosure is not limited thereto. In addition, a beam splitting filter sub-region 124d of a beam splitting filter device 1201 of the embodiment replaces the beam splitting filter sub-region 124b of the beam splitting filter device 120 in FIG. 2.

In the embodiment, the supplementary light source emits the supplementary beam L3 to at least a partial region of the beam splitting filter region 124 (such as the beam splitting filter sub-region 124d) of the beam splitting filter device, and the supplementary beam L3 is reflected to the beam combining element 170 by the at least a partial region of the beam splitting filter region 124 (such as the beam splitting filter sub-region 124d) of the beam splitting filter device. In detail, the beam splitting filter sub-region 124d may be designed to reflect the excitation beam EB and the supplementary beam L3, and filter out the beams in the conversion beam CB other than the beam in the red wavelength range, enabling the beam in the red wavelength range in the conversion beam CB to pass through. It is worth mentioning that the red wavelength range in the conversion beam CB here does not include the wavelength range of the supplementary beam L3. In other words, the beam splitting filter sub-region 124d reflects the supplementary beam L3 and allows the red beam with a wavelength different from that of the supplementary beam L3 to pass through.

Therefore, the beam splitting filter sub-region 124d may transmit the excitation beam EB coming from the excitation light source 110 to the wavelength conversion region 132 (or the wavelength conversion sub-region 132b) of the wavelength conversion element 130, transmit the supplementary beam L3 coming from the supplementary light source (such as the supplementary light source 190a, or the supplementary light source 190b in FIG. 10) to the beam combining element 170, and allow the conversion beam CB coming from the wavelength conversion element 130 to at least partially pass through, so as to form the second beam L2 (such as the red light) when the excitation beam EB coming from the excitation light source 110 and the supplementary beam L3 coming from the supplementary light source (such as the supplementary light source 190a, or the supplementary light source 190b in FIG. 10) are incident on the beam splitting filter sub-region 124d of the beam splitting filter region 124 respectively from two opposite sides of the beam splitting filter device 1201. The wavelength range of the second beam L2 in this timing (such as the third timing TA3 in FIG. 12 or FIG. 13) is different from and does not include the wavelength range of the supplementary beam L3.

In addition, it should be noted that multiple supplementary light sources and multiple diffusion elements shown in FIG. 10 are only to illustrate possible positions of the above-mentioned elements, rather than simultaneously disposing the multiple supplementary light sources and the multiple diffusion elements. That is, only one of the supplementary light source 190a and the supplementary light source 190b, and a corresponding diffusion element may be disposed.

In some embodiments, the illumination system 100b may include the supplementary light source 190a, and the supplementary light source 190a emits the supplementary beam L3 to the light transmission element 162. The light transmission element 162 allows the supplementary beam L3 to pass through and transmits the supplementary beam L3 to the beam splitting filter sub-region 124d. The beam splitting filter sub-region 124d reflects the supplementary beam L3 to the beam combining element 170. The beam combining element 170 may also be designed to allow the supplementary beam L3 to pass through and transmit the supplementary beam L3 to the homogenizing element 180, so as to form the illumination beam IB. The light transmission element 162 is, for example, the dichroic unit configured to allow the supplementary beam L3 to pass through and reflect the first beam L1. In these embodiments, the illumination system 100b may include the diffusion element DF1 located between the supplementary light source 190a and the light transmission element 162, or the beam splitting filter sub-region 124d of the beam splitting filter region 124 may include a diffusion structure.

In some embodiments, the illumination system 100b may include the supplementary light source 190b, and the supplementary light source 190b emits the supplementary beam L3 to the light transmission element 164. The light transmission element 164 allows the supplementary beam L3 to pass through and transmits the supplementary beam L3 to the light transmission element 162. The light transmission element 162 reflects the supplementary beam L3 to the beam splitting filter sub-region 124d. The beam splitting filter sub-region 124d reflects the supplementary beam L3 to the beam combining element 170. The beam combining element 170 may also be designed to allow the supplementary beam L3 to pass through and transmit the supplementary beam L3 to the homogenizing element 180, so as to form the illumination beam IB. The light transmission element 164 is, for example, the dichroic unit configured to allow the supplementary beam L3 to pass through and reflect the first beam L1. The light transmission element 162 is, for example, the reflector, but in other embodiments that use the supplementary light source 190b, the light transmission element 162 may also be the dichroic unit with the function of reflecting the supplementary beam L3 and reflecting the first beam L1. In these embodiments, the illumination system 100b may include the diffusion element DF2 located between the supplementary light source 190b and the light transmission element 164, or the beam splitting filter sub-region 124d of the beam splitting filter region 124 may include the diffusion structure.

Figure 12:
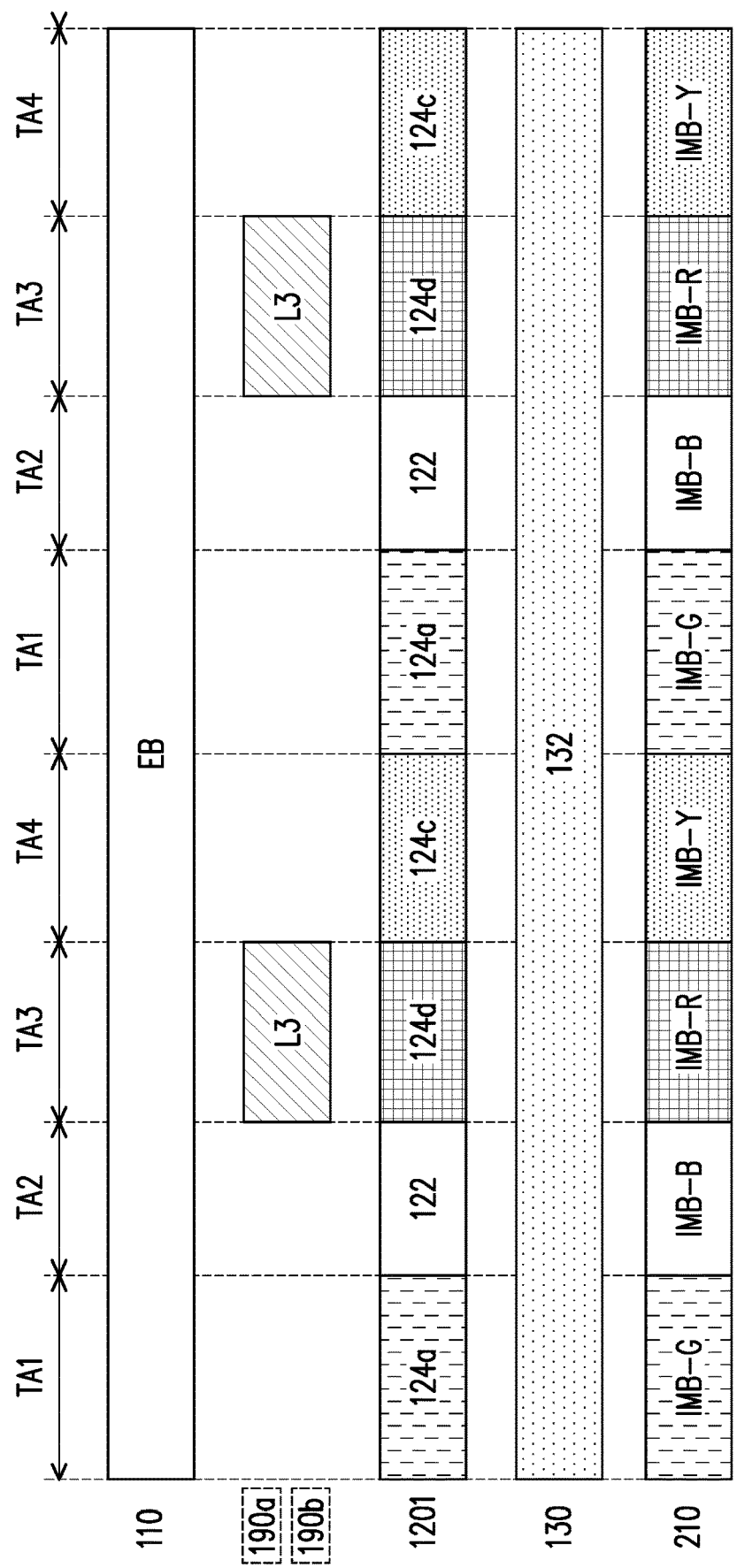
FIG. 12 is a schematic view of an operation mode according to the third embodiment of the disclosure.

FIG. 12 is a schematic view of an operation mode according to the third embodiment of the disclosure. The projection device 200b of the embodiment may cooperate with the beam splitting filter device 1201 in FIG. 11 and the wavelength conversion element 130 in FIG. 3. Hereinafter, in conjunction with FIGS. 10, 11, 3, and 12, an example is described to illustrate a process of the projection device 200b providing the projection picture when the number of the at least one light valve 210 is one.

An operation mode of FIG. 12 is similar to the operation mode of FIG. 8. The main difference is that in the embodiment, in the third timing TA3, the beam splitting filter sub-region 124d of the beam splitting filter device 1201 reflects the supplementary beam L3 coming from the supplementary light source 190a, or the supplementary light source 190b, and reflects the excitation beam EB coming from the excitation light source 110 to the wavelength conversion region 132 of the wavelength conversion element 130, the wavelength conversion region 132 of the wavelength conversion element 130 converts the excitation beam EB coming from the beam splitting filter device 1201 to the conversion beam CB (such as the yellow-green light), and then transmits the conversion beam CB back to the beam splitting filter sub-region 124d of the beam splitting filter device 1201, and the conversion beam CB coming from the wavelength conversion element 130 at least partially penetrates the beam splitting filter sub-region 124d, so as to form the second beam L2 (such as the red light). The wavelength range of the second beam L2 is different from and does not include the wavelength range of the supplementary beam L3. In the third timing TA3, the light valve 210 is switched to the third state, so as to convert the second beam L2 and the supplementary beam L3 to the red image beam IMB-R.

Figure 13:
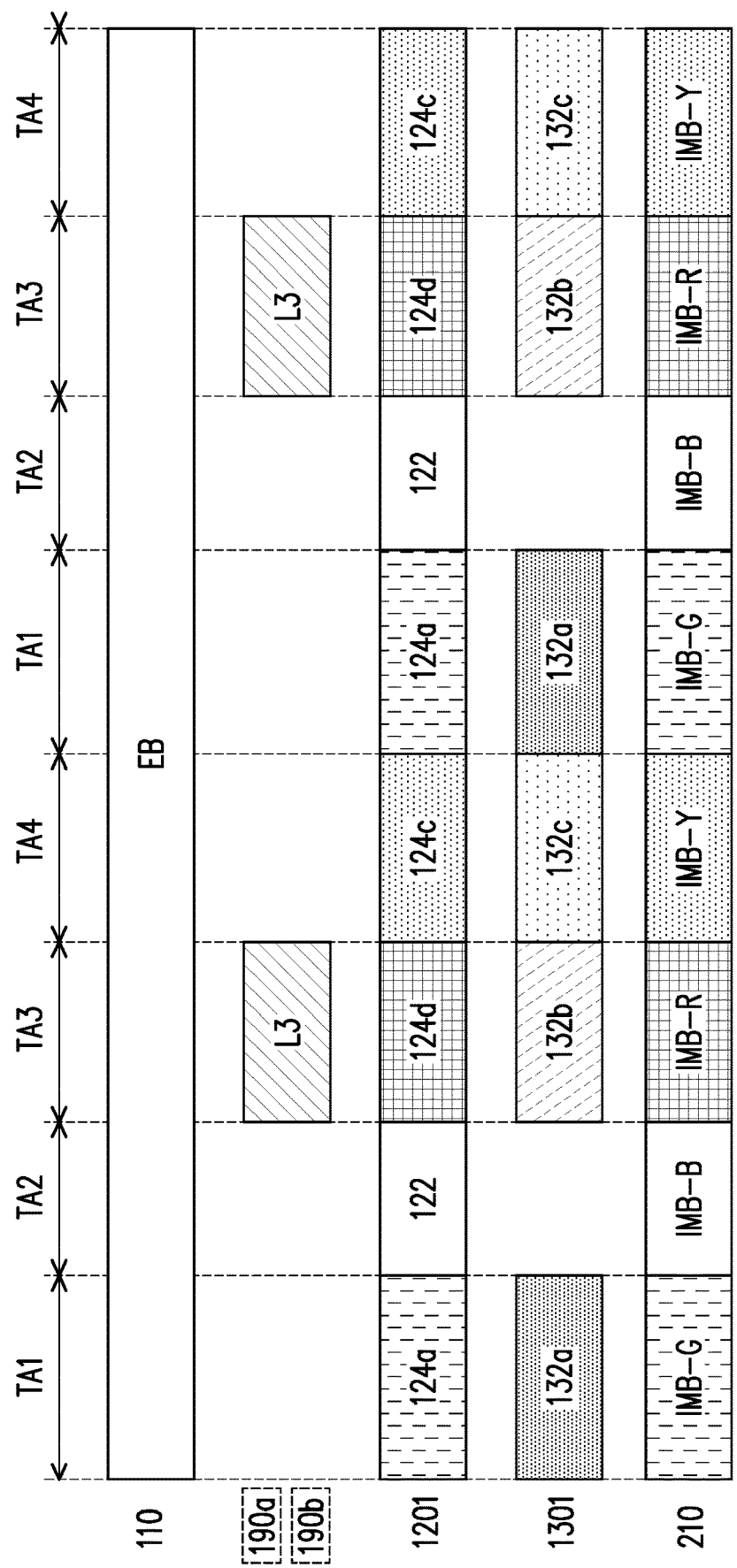
FIG. 13 is a schematic view of another operation mode according to the third embodiment of the disclosure.

FIG. 13 is a schematic view of another operation mode according to the third embodiment of the disclosure. The projection device 200b of the embodiment may cooperate with the beam splitting filter device 1201 in FIG. 11 and the wavelength conversion element 1301 in FIG. 5. Hereinafter, in conjunction with FIGS. 10, 11, 5, and 13, an example is described to illustrate the process of the projection device 200*b* providing the projection picture when the number of the at least one light valve 210 is one.

An operation mode of FIG. 13 is similar to the operation mode of FIG. 9. The main difference is that in the embodiment, in the third timing TA3, the beam splitting filter sub-region 124*d* of the beam splitting filter device 1201 reflects the supplementary beam L3 coming from the supplementary light source 190*a*, or the supplementary light source 190*a*, and reflects the excitation beam EB coming from the excitation light source 110 to the wavelength conversion sub-region 132*b* of the wavelength conversion element 1301, the wavelength conversion sub-region 132*b* of the wavelength conversion element 1301 converts the excitation beam EB coming from the beam splitting filter device 1201 to the conversion beam CB (such as the red light), and then transmits the conversion beam CB back to the beam splitting filter sub-region 124*d* of the beam splitting filter device 1201, and the conversion beam CB coming from the wavelength conversion element 1301 at least partially penetrates the beam splitting filter sub-region 124*d*, so as to form the second beam L2 (such as the red light). The wavelength range of the second beam L2 is different from and does not include the wavelength range of the supplementary beam L3. In the third timing TA3, the light valve 210 is switched to the third state, so as to convert the second beam L2 and the supplementary beam L3 to the red image beam IMB-R.

Figure 14:
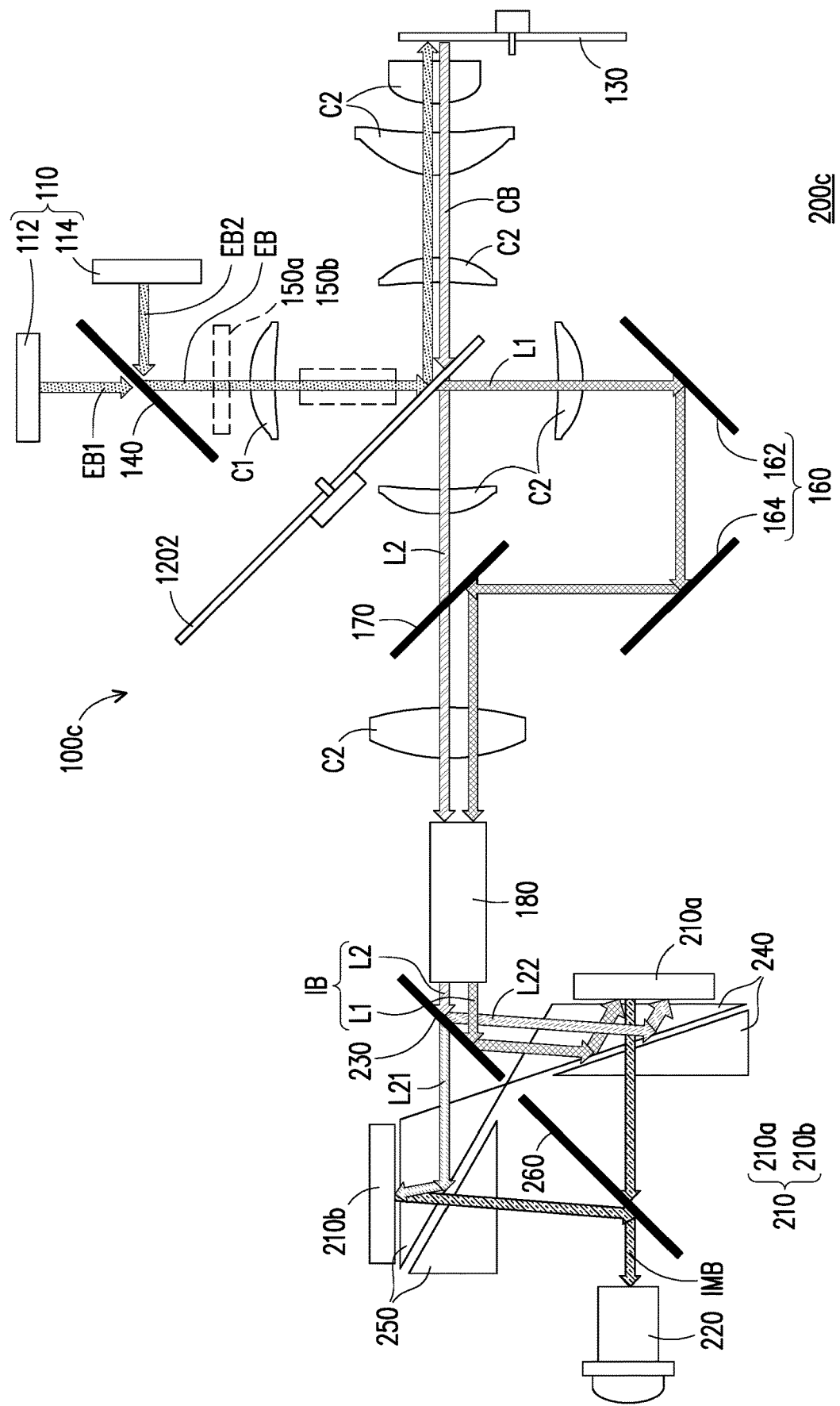
FIG. 14 is a schematic structural view of a projection device according to a fourth embodiment of the disclosure.
Figure 15:
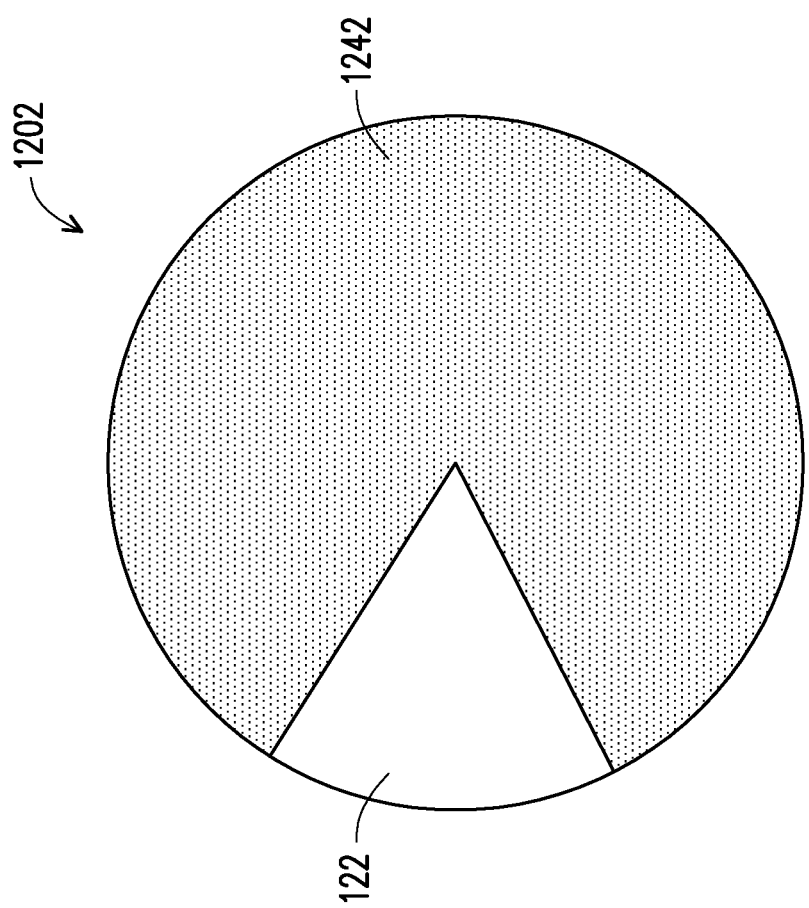
FIG. 15 is a schematic front view of a beam splitting filter device according to the fourth embodiment of the disclosure.

FIG. 14 is a schematic structural view of a projection device according to a fourth embodiment of the disclosure. FIG. 15 is a schematic front view of a beam splitting filter device according to the fourth embodiment of the disclosure. With reference to FIGS. 14 and 15, a projection device 200*c* of the embodiment is similar to the projection device 200 in FIG. 1. The main difference is that the number of the at least one light valve 210 of the projection device 200*c* of the embodiment is two (such as a light valve 210*a* and a light valve 210*b* in FIG. 14), and a beam splitting filter region 1242 of a beam splitting filter device 1202 of an illumination system 100*c* of the projection device 200*c* does not have multiple beam splitting filter sub-regions. Since the projection device 200*c* of the embodiment may cooperate with the wavelength conversion element 130 in FIG. 3, and the beam splitting filter region 1242 is constituted of the same material, the second beam L2 has the same wavelength range at the different timings.

In the embodiment, the beam splitting filter region 1242 may be designed to reflect the excitation beam EB, filter out beams in the conversion beam CB other than a beam in the yellow-green wavelength range, and enabling the beam in the yellow-green wavelength range to pass through.

In the embodiment, the projection device 200*c* further includes a beam splitting element 230, an optical lens group 240, an optical lens group 250, and a beam combining element 260. The beam splitting element 230 is disposed on the transmission paths of the first beam L1 and the second beam L2. The beam splitting element 230 is, for example, a dichroic mirror, and may be designed to reflect the first beam L1, and reflect beams in the second beam L2 other than the beam in the red wavelength range, and enabling the beam in the red wavelength range to pass through. Therefore, the first beam L1 is reflected to the optical lens group 240 by the beam splitting element 230, and the second beam L2 forms a red beam L21 that passes through the beam splitting element 230 by the beam splitting element 230 and forms a green beam L22 that is reflected by the beam splitting element 230. The optical lens group 240 is configured to transmit the first beam L1 and the green beam L22 coming from the beam splitting element 230 to the light valve 210*a*, and transmit the image beam IMB coming from the light valve 210*a* to the beam combining element 260. The optical lens group 240 is configured to transmit the red beam L21 coming from the beam splitting element 230 to the light valve 210*b*, and transmit the image beam IMB coming from the light valve 210*b* to the beam combining element 260. The beam combining element 260 allows the image beam IMB coming from one of the light valve 210*a* and the light valve 210*b* (in the embodiment, such as the image beam IMB coming from the light valve 210*a*) to pass through, and reflects the image beam IMB coming from the other of the light valve 210*a* and the light valve of 210*b* (in the embodiment, such as the image beam IMB coming from the light valve 210*b*), so as to transmit the image beam IMB from the light valve 210*b* and the light valve 210*b* to the projection lens 220.

Figure 16:
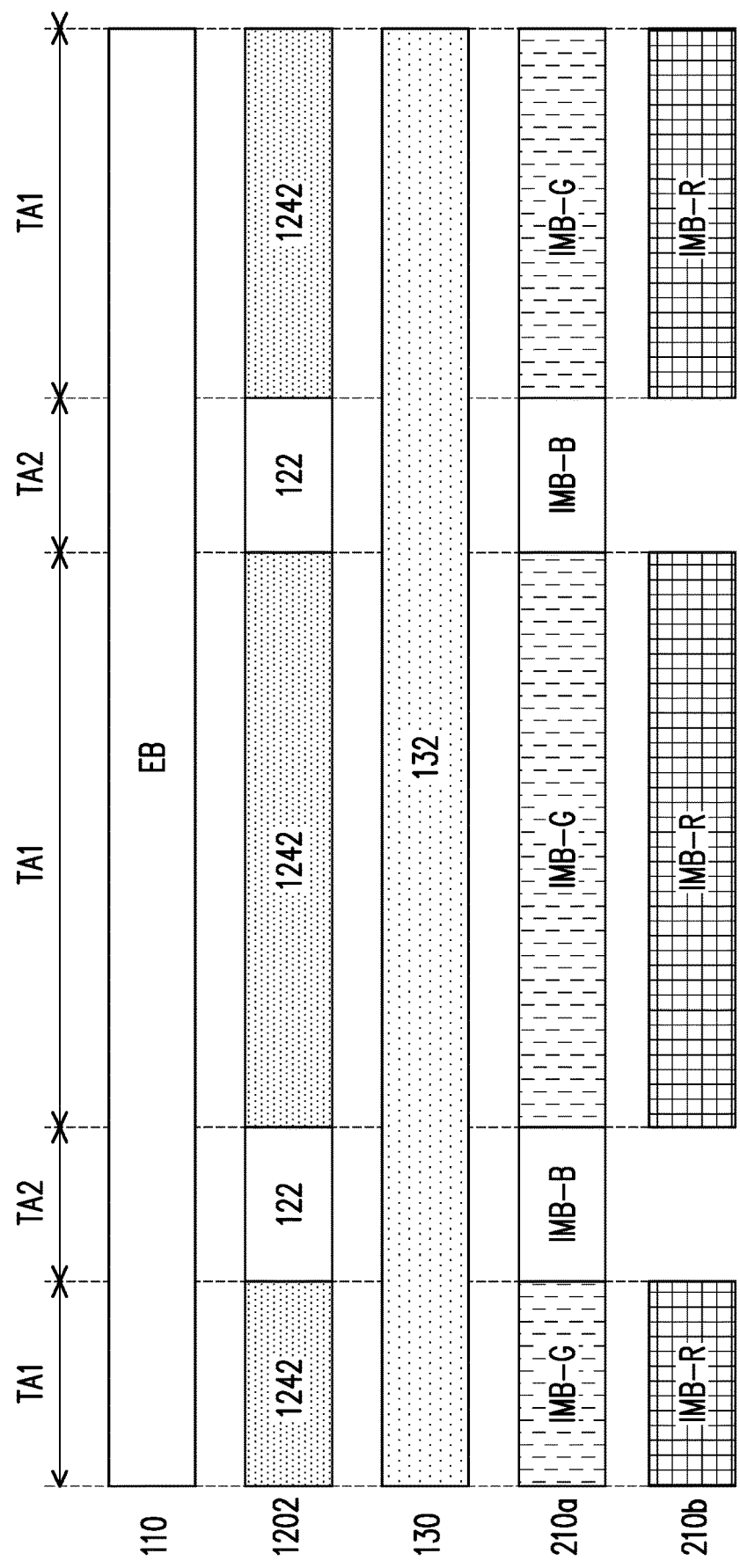
FIG. 16 is a schematic view of an operation mode according to the fourth embodiment of the disclosure.

FIG. 16 is a schematic view of an operation mode according to the fourth embodiment of the disclosure. The projection device 200*c* of the embodiment may cooperate with the beam splitting filter device 1202 in FIG. 15 and the wavelength conversion element 130 in FIG. 3. Hereinafter, in conjunction with FIGS. 14, 15, 3, and 16, an example is described to illustrate a process of the projection device 200*c* providing the projection picture when the number of the at least one light valve 210 is two. The projection device 200*c* of the embodiment has, for example, the first timing TA1 and the second timing TA2, and the excitation light source 110 is continuously switched on in the above-mentioned timings to emit the excitation beam EB (such as the blue light).

In the first timing TA1, the beam splitting filter region 1242 of the beam splitting filter device 1202 reflects the excitation beam EB coming from the excitation light source 110 to the wavelength conversion region 132 of the wavelength conversion element 130, the wavelength conversion region 132 of the wavelength conversion element 130 converts the excitation beam EB coming from the beam splitting filter device 1202 to the conversion beam CB (such as the yellow-green light), and then transmits the conversion beam CB back to the beam splitting filter region 1242 of the beam splitting filter device 1202, and the conversion beam CB coming from the wavelength conversion element 130 at least partially penetrates the beam splitting filter region 1242, so as to form the second beam L2 (such as the yellow-green light). The light valve 210*a* and the light valve 210*b* are switched to the first state in the first timing TA1. The green beam L22 coming from the beam splitting element 230 is incident on the light valve 210*a*, so as to convert the green beam L22 to the green image beam IMB-G. The red beam L21 coming from the beam splitting element 230 is incident on the light valve 210*b*, so as to convert the red beam L21 to the red image beam IMB-R. The green image beam IMB-G and the red image beam IMB-R are projected by the projection lens 220 to the projection target (such as the screen, or the wall) to form green and red pictures.

In the second timing TA2, the excitation beam EB coming from the excitation light source 110 penetrates the light penetration region 122 of the beam splitting filter device 1202, so as to form the first beam L1 (such as the blue light). The light valve 210*a* is switched to the second state and the light valve 210*b* is switched to an idle state in the second timing TA2. The first beam L1 coming from the beam splitting element 230 is incident on the light valve 210*a*, so as to convert the first beam L1 to the blue image beam IMB-B. The blue image beam IMB-B is projected by the projection lens 220 to the projection target (such as the screen, or the wall) to form the blue picture.

As described above, the projection device 200c projects the green image beam IMB-G and the red image beam IMB-R in the first timing TA1, and projects the blue image beam IMB-B in the second timing TA2 to the projection target (such as the screen, or the wall). The green, red, and blue pictures formed may compose a needed color projection picture by using visual persistence of the human eye.

Figure 17:
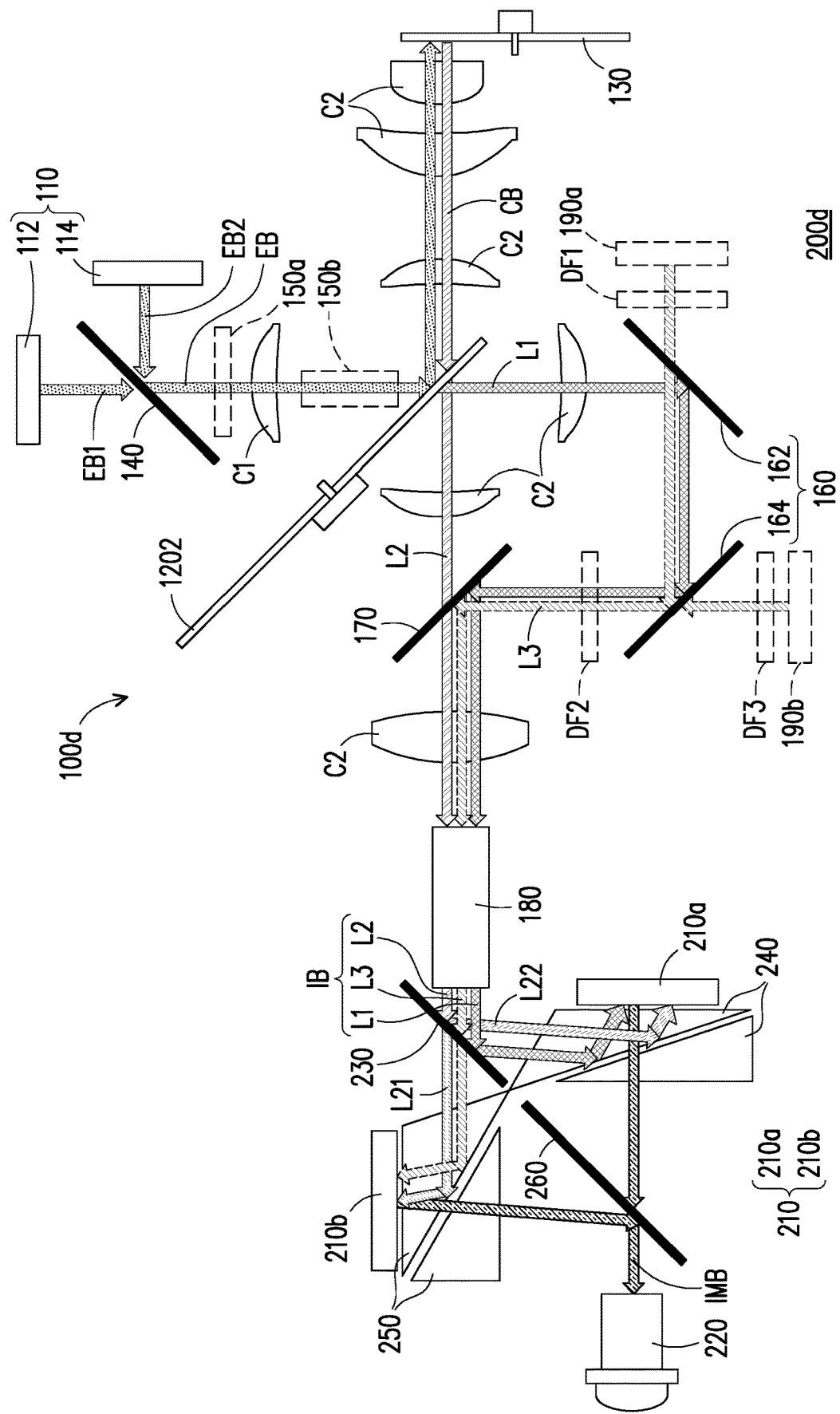
FIG. 17 is a schematic structural view of a projection device according to a fifth embodiment of the disclosure.

FIG. 17 is a schematic structural view of a projection device according to a fifth embodiment of the disclosure. With reference to FIG. 17, a projection device 200d of the embodiment is similar to the projection device 200c in FIG. 14. The main difference is that an illumination system 100d of the projection device 200d of the embodiment further includes a supplementary light source (such as the supplementary light source 190a, or the supplementary light source 190b in FIG. 17) and a diffusion element (such as the diffusion element DF1, the diffusion element DF2, or the diffusion element DF3 in FIG. 17). Reference may be made to the projection device 200a in FIG. 7 for the related description of the supplementary light source and the diffusion element, which will not be reiterated here.

In the embodiment, the beam splitting element 230 is also disposed on the transmission path of the supplementary beam L3, and may also be designed to allow the supplementary beam L3 to pass through. The optical lens group 240 transmits the supplementary beam L3 coming from the beam splitting element 230 to the light valve 210b.

Figure 18:
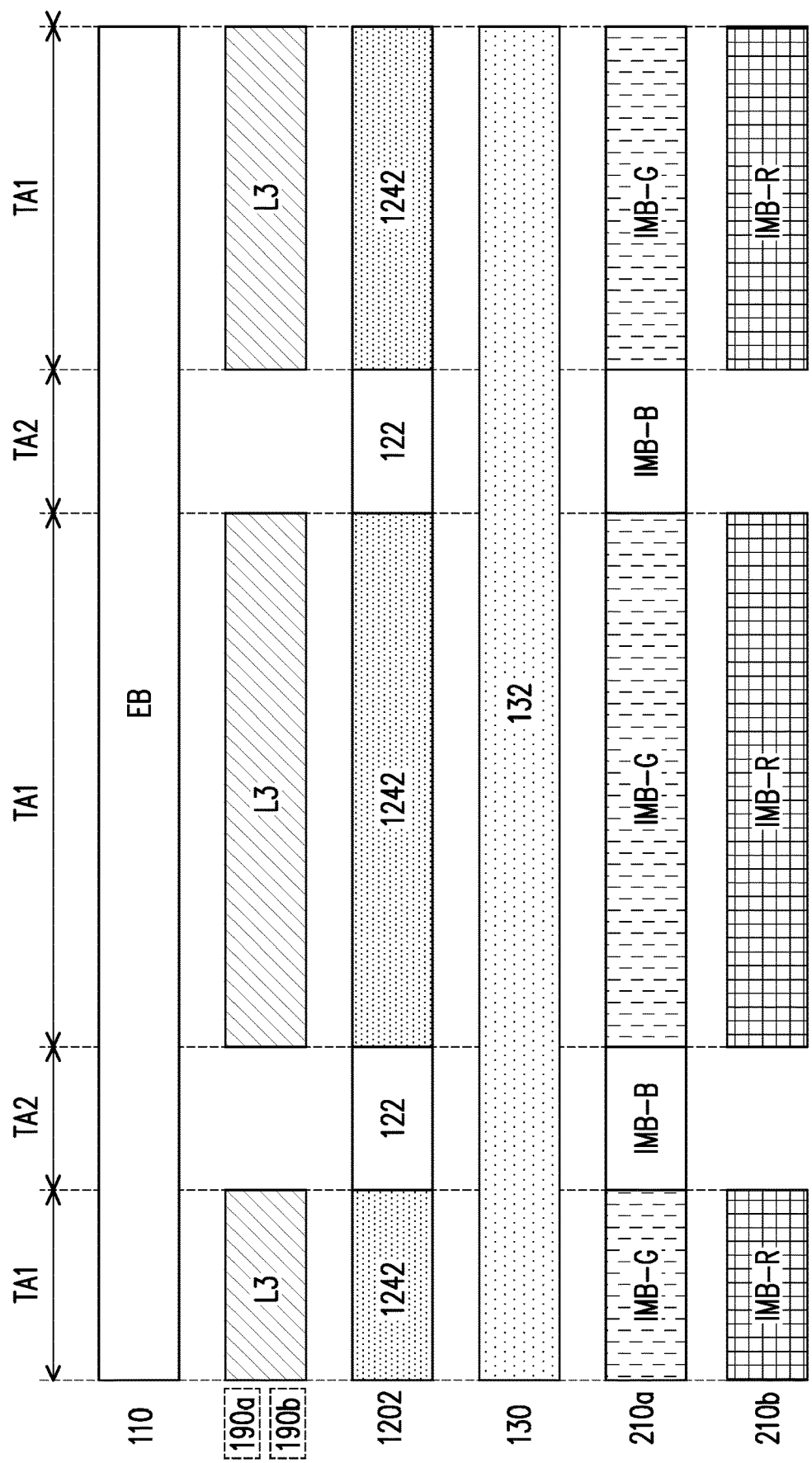
FIG. 18 is a schematic view of an operation mode according to the fifth embodiment of the disclosure.

FIG. 18 is a schematic view of an operation mode according to the fifth embodiment of the disclosure. The projection device 200d of the embodiment may cooperate with the beam splitting filter device 1202 in FIG. 15 and the wavelength conversion element 130 in FIG. 3. Hereinafter, in conjunction with FIGS. 17, 15, 3, and 18, an example is described to illustrate a process of the projection device 200d providing the projection picture when the number of the at least one light valve 210 is two.

An operation mode of FIG. 18 is similar to the operation mode of FIG. 16. The main difference is that the projection device 200d of the embodiment switches on the supplementary light source (such as the supplementary light source 190a, or the supplementary light source 190b in FIG. 17) in the first timing TA1, so as to emit the supplementary beam L3 (such as the red light), and the supplementary light source is switched off in the second timing TA2. The light valve 210b converts the red beam L21 and the supplementary beam L3 coming from the beam splitting element 230 to the red image beam IMB-R in the first timing TA1.

Figure 19:
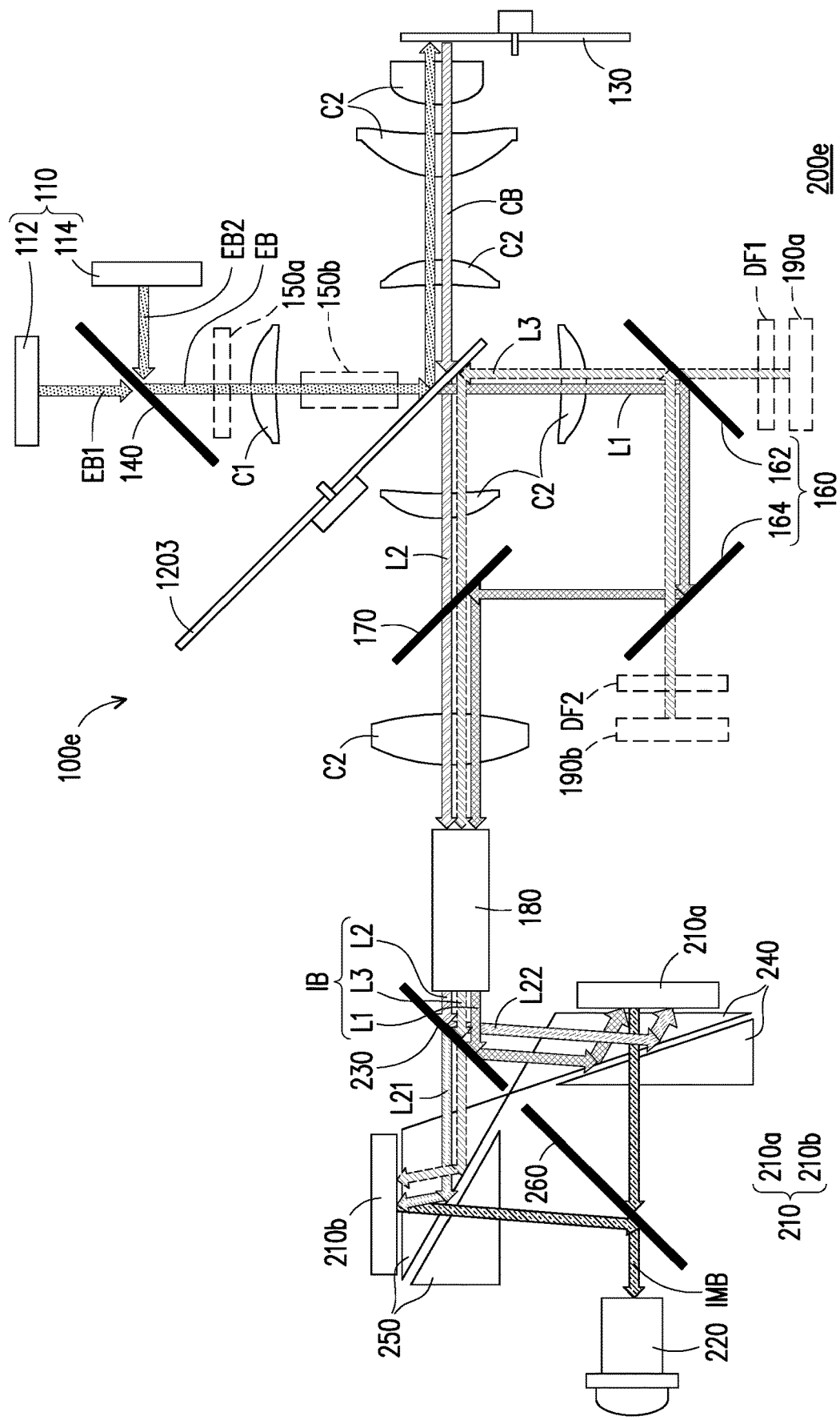
FIG. 19 is a schematic structural view of a projection device according to a sixth embodiment of the disclosure.
Figure 20:
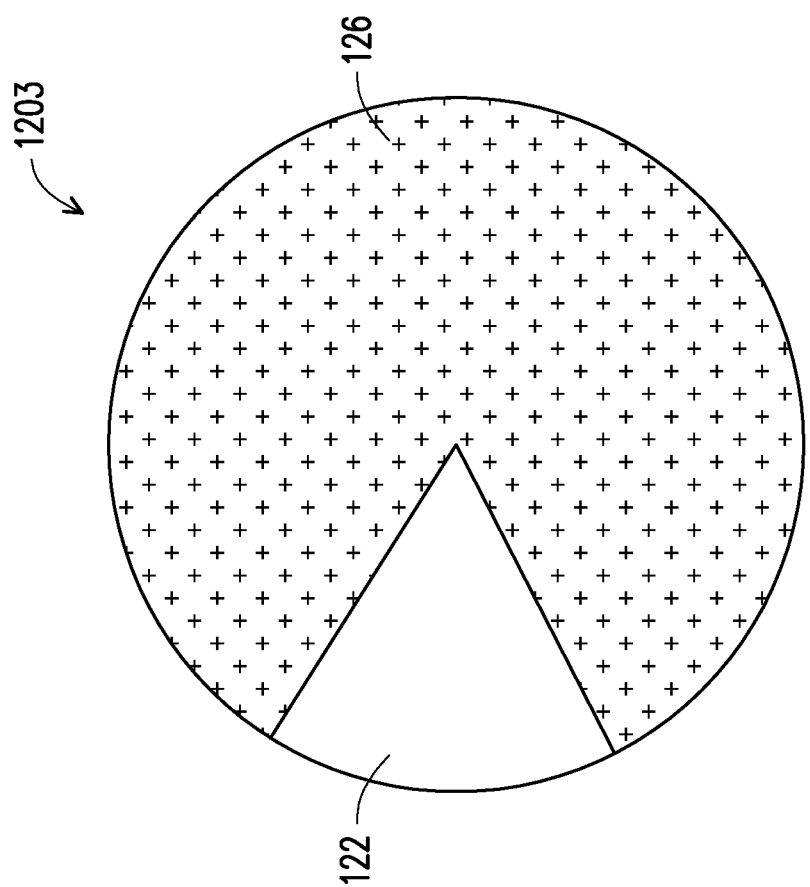
FIG. 20 is a schematic front view of a beam splitting filter device according to the sixth embodiment of the disclosure.

FIG. 19 is a schematic structural view of a projection device according to a sixth embodiment of the disclosure. FIG. 20 is a schematic front view of a beam splitting filter device according to the sixth embodiment of the disclosure. With reference to FIGS. 19 and 20, a projection device 200e of the embodiment is similar to the projection device 200c in FIG. 14. The main difference is that an illumination system 100e of the projection device 200e of the embodiment further includes a supplementary light source (such as the supplementary light source 190a, or the supplementary light source 190b in FIG. 19) and/or a diffusion element (such as the diffusion element DF1, or the diffusion element DF2 in FIG. 19). Reference may be made to the projection device 200b in FIG. 10 for related descriptions of the supplementary light source or the diffusion element, which will not be reiterated here. In addition, a beam splitting filter region 126 of a beam splitting filter device 1203 of the embodiment replaces the beam splitting filter region 1242 in FIG. 15. The beam splitting filter region 126 may include a diffusion structure when the illumination system 100e does not include the diffusion element DF1 or the diffusion element DF2.

In the embodiment, the supplementary light source emits the supplementary beam L3 to the beam splitting filter region 126 of the beam splitting filter device 1203, and the supplementary beam L3 is reflected by the beam splitting filter region 126 of the beam splitting filter device 1203 to the beam combining element 170. In detail, the beam splitting filter region 126 may be designed to reflect the excitation beam EB and the supplementary beam L3, and filter out beams in the conversion beam CB other than a beam in the yellow-green wavelength range, and enabling the beam in the yellow-green wavelength range to pass through. It is worth mentioning that the yellow-green wavelength range here does not include the wavelength range of the supplementary beam L3. In other words, the beam splitting filter region 126 reflects the supplementary beam L3 and allows the yellow-green beam with a wavelength different from that of the supplementary beam L3 to pass through.

Therefore, the beam splitting filter region 126 may transmit the excitation beam EB coming from the excitation light source 110 to the wavelength conversion region 132 of the wavelength conversion element 130, transmit the supplementary beam L3 coming from the supplementary light source (such as the supplementary light source 190a, or the supplementary light source 190b in FIG. 19) to the beam combining element 170, and allow the conversion beam CB coming from the wavelength conversion element 130 to at least partially pass through, so as to form the second beam L2 (such as the yellow-green light) when the excitation beam EB coming from the excitation light source 110 and the supplementary beam L3 coming from the supplementary light source (such as the supplementary light source 190a, or the supplementary light source 190b in FIG. 19) are incident on the beam splitting filter region 126 respectively from two opposite sides of the beam splitting filter device 1203. The wavelength range of the second beam L2 in this timing (such as the first timing TA1 in FIG. 21) is different from and does not include the wavelength range of the supplementary beam L3.

Figure 21:
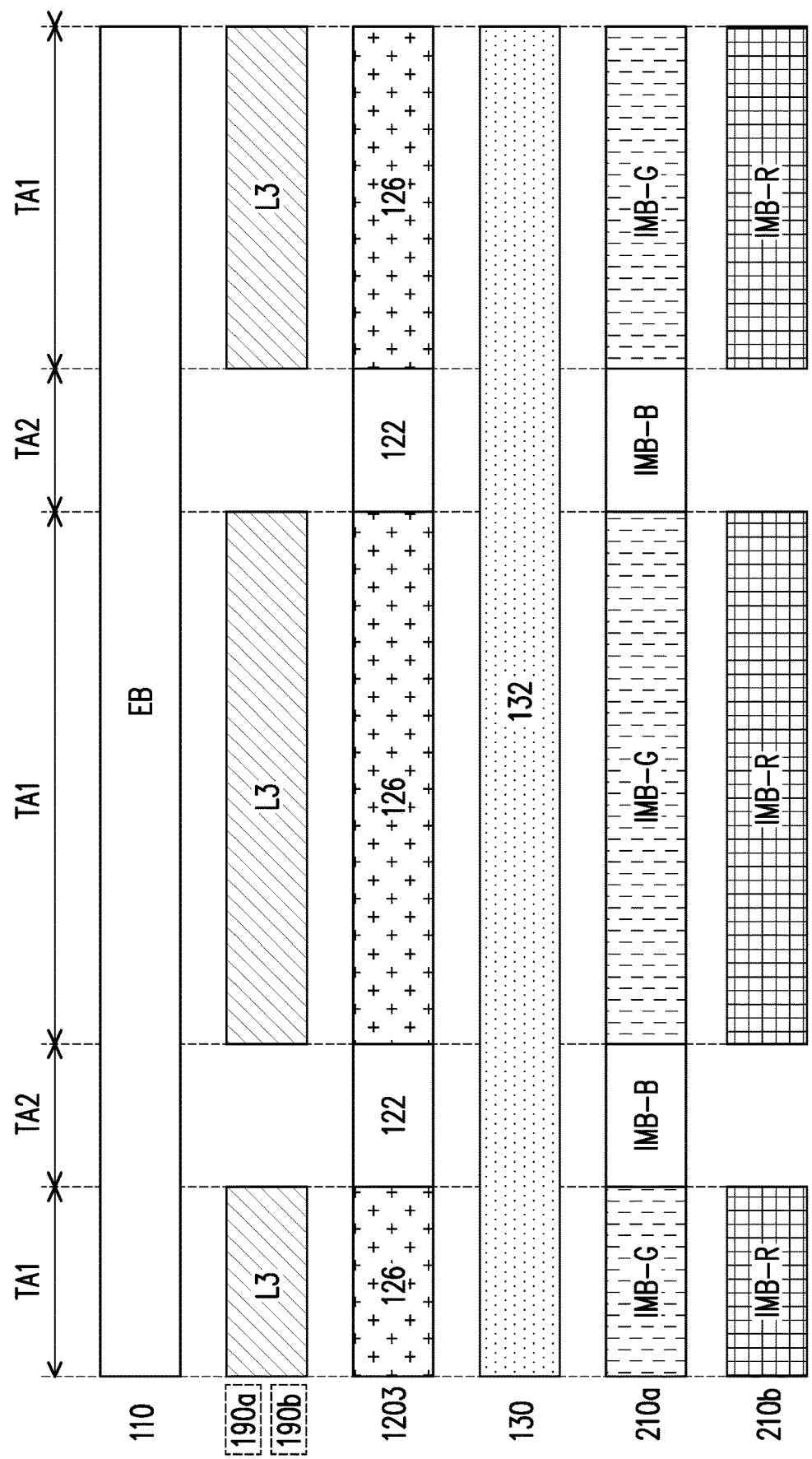
FIG. 21 is a schematic view of an operation mode according to the sixth embodiment of the disclosure.

FIG. 21 is a schematic view of an operation mode according to the sixth embodiment of the disclosure. The projection device 200e of the embodiment may cooperate with the beam splitting filter device 1203 in FIG. 20 and the wavelength conversion element 130 in FIG. 3. Hereinafter, in conjunction with FIGS. 19, 20, 3, and 21, an example is described to illustrate a process of the projection device 200e providing the projection picture when the number of the at least one light valve 210 is two.

An operation mode of FIG. 21 is similar to the operation mode of FIG. 18. The main difference is that in the embodiment, in the first timing TA1, the beam splitting filter region 126 of the beam splitting filter device 1203 reflects the supplementary beam L3 coming from the supplementary light source 190a, or the supplementary light source 190b, reflects the excitation beam EB coming from the excitation light source 110 to the wavelength conversion region 132 of the wavelength conversion element 130, the wavelength conversion region 132 of the wavelength conversion element 130 converts the excitation beam EB coming from the beam splitting filter device 1203 to the conversion beam CB (such as the yellow-green light), and then transmits the conversion beam CB back to the beam splitting filter region 126 of the beam splitting filter device 1203, and the conversion beam CB coming from the wavelength conversion element 130 at least partially penetrates the beam splitting filter region 126, so as to form the second beam L2 (such as the yellow and green light). The wavelength range of the second beam L2 is different from and does not include the wavelength range of the supplementary beam L3. The light valve 210b converts the red beam L21 and the supplementary beam L3 coming from the beam splitting element 230 to the red image beam IMB-R.

In summary, in the illumination system and the projection device according to the embodiment of the disclosure, the beam splitting filter device may simultaneously have both the beam splitting and light filtering functions. In other words, the beam splitting filter device may not only enables the excitation beam coming from the excitation light source to travel through the different beam paths at the different timings, so that the excitation beam that does not need to be converted is not transmitted to the wavelength conversion element, it may also filters the excitation beam coming from the wavelength conversion element. Therefore, the illumination system and the projection device of the embodiment can have a simpler structure, without having to dispose the two independent optical elements to respectively achieve both the beam splitting and filtering actions. This helps to reduce costs and simplifies the complexity of synchronous control between the electronic components.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enabling persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the terms "the invention", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. An illumination system, comprising an excitation light source, a beam splitting filter device, a beam combining element, a supplementary light source and a wavelength conversion element, wherein the excitation light source is configured to emit an excitation beam;

the beam splitting filter device comprises a light penetration region and a beam splitting filter region, wherein the light penetration region and the beam splitting filter region sequentially cut into a transmission path of the excitation beam, the excitation beam penetrates the light penetration region to form a first beam when the light penetration region cuts into the transmission path of the excitation beam, and the excitation beam is reflected by the beam splitting filter region when the beam splitting filter region cuts into the transmission path of the excitation beam;

the wavelength conversion element is disposed on a transmission path of the excitation beam coming from the beam splitting filter region, and is configured to convert the excitation beam coming from the beam splitting filter region to a conversion beam and transmit the conversion beam back to the beam splitting filter region, wherein the conversion beam at least partially penetrates the beam splitting filter region to form a second beam;

the beam combining element is disposed on transmission paths of the first beam and the second beam coming from the beam splitting filter device, wherein the beam combining element reflects the first beam and allows the second beam to pass through; and the supplementary light source is configured to emit a supplementary beam, wherein the beam combining element is also disposed on a transmission path of the supplementary beam.

2. The illumination system according to claim 1, further comprising a light beam shaping element, wherein the light beam shaping element is disposed between the excitation light source and the beam splitting filter device, and is configured to adjust a light beam shape or a beam energy distribution of the excitation beam.

3. The illumination system according to claim 2, wherein the light beam shaping element comprises a lens array, a diffusion element or a light integration rod.

4. The illumination system according to claim 1, wherein the second beam has a same wavelength range at different timings.

5. The illumination system according to claim 1, wherein the beam splitting filter region comprises a plurality of beam splitting filter sub-regions that are different from each other, and the conversion beam coming from the wavelength conversion element sequentially irradiates the plurality of beam splitting filter sub-regions, enabling the second beam to have different wavelength ranges at different timings.

6. The illumination system according to claim 1, wherein the wavelength conversion element comprises a wavelength conversion region, and the wavelength conversion region has a same wavelength conversion material and is shaped as a ring, enabling the conversion beam to have a same wavelength range at different timings.

7. The illumination system according to claim 1, wherein the wavelength conversion element comprises a plurality of wavelength conversion sub-regions, and the plurality of wavelength conversion sub-regions respectively have different wavelength conversion materials, enabling the conversion beam to have different wavelength ranges at different timings.

8. The illumination system according to claim 7, wherein the beam splitting filter region comprises a plurality of beam splitting filter sub-regions that are different from each other, and the conversion beam coming from the wavelength conversion element sequentially irradiates the plurality of beam splitting filter sub-regions, enabling the second beam to have the different wavelength ranges at the different timings, wherein the conversion beam coming from a first wavelength conversion sub-region of the plurality of wavelength conversion sub-regions irradiates a first beam splitting filter sub-region of the plurality of beam splitting filter sub-regions and the conversion beam coming from a second wavelength conversion sub-region of the plurality of wavelength conversion sub-regions irradiates a second beam splitting filter sub-region of the plurality of beam splitting filter sub-regions.

9. The illumination system according to claim 1, wherein the second beam is transmitted from the beam splitting filter device to the beam combining element along a same traveling direction.

10. The illumination system according to claim 1, wherein the supplementary light source emits the supplementary beam to at least a partial region of the beam splitting filter region when the at least a partial region of the beam splitting filter region cuts into the transmission path of the excitation beam, and the supplementary beam is reflected by the at least a partial region of the beam splitting filter region to the beam combining element.

11. The illumination system according to claim 10, wherein the excitation beam and the supplementary beam are incident on the at least a partial region of the beam splitting filter region respectively from two opposite sides of the beam splitting filter device.

12. The illumination system according to claim 10, wherein the at least a partial region of the beam splitting filter region comprises a diffusion structure.

13. The illumination system according to claim 1, wherein the light penetration region comprises a diffusion structure.

14. The illumination system according to claim 1, wherein the excitation beam is incident on the beam splitting filter device obliquely.

15. The illumination system according to claim 1, wherein an area of the light penetration region is smaller than an area of the beam splitting filter region.

16. A projection device, comprising an illumination system, at least one light valve, and a projection lens, wherein
the illumination system comprises an excitation light source, a beam splitting filter device, a beam combining element, a supplementary light source and a wavelength conversion element, wherein
the excitation light source is configured to emit an excitation beam;
the beam splitting filter device comprises a light penetration region and a beam splitting filter region, wherein the light penetration region and the beam splitting filter region sequentially cut into a transmission path of the excitation beam, the excitation beam penetrates the light penetration region to form a first beam when the light penetration region cuts into the transmission path of the excitation beam, and the excitation beam is reflected by the beam splitting filter region when the beam splitting filter region cuts into the transmission path of the excitation beam;
the wavelength conversion element is disposed on a transmission path of the excitation beam coming from the beam splitting filter region, and is configured to convert the excitation beam coming from the beam splitting filter region to a conversion beam and transmit the conversion beam back to the beam splitting filter region, wherein the conversion beam at least partially penetrates the beam splitting filter region to form a second beam;
the beam combining element is disposed on transmission paths of the first beam and the second beam coming from the beam splitting filter device, wherein the beam combining element reflects the first beam and allows the second beam to pass through; and
the supplementary light source is configured to emit a supplementary beam, wherein the beam combining element is also disposed on a transmission path of the supplementary beam;
the at least one light valve is disposed on transmission paths of the first beam and the second beam, so as to adjust the first beam and the second beam to become an image beam; and
the projection lens is disposed on a transmission path of the image beam.

17. The projection device according to claim 16, wherein a number of the at least one light valve is two, and the second beam has a same wavelength range at different timings.

18. The projection device according to claim 16, wherein a number of the at least one light valve is one, and the beam splitting filter region comprises a plurality of beam splitting filter sub-regions that are different from each other, and the conversion beam coming from the wavelength conversion element sequentially irradiates the plurality of beam splitting filter sub-regions, enabling the second beam to have different wavelength ranges at different timings.

19. The projection device according to claim 16, wherein the wavelength conversion element comprises a wavelength conversion region, and the wavelength conversion region has a same wavelength conversion material and is shaped as a ring, enabling the conversion beam to have a same wavelength range at different timings.

20. The projection device according to claim 16, wherein a number of the at least one light valve is one, and the wavelength conversion element comprises a plurality of wavelength conversion sub-regions, and the plurality of wavelength conversion sub-regions respectively have different wavelength conversion materials, enabling the conversion beam to have different wavelength ranges at different timings.

21. The projection device according to claim 20, wherein the beam splitting filter region comprises a plurality of beam splitting filter sub-regions that are different from each other, and the conversion beam coming from the wavelength conversion element sequentially irradiates the plurality of beam splitting filter sub-regions, enabling the second beam to have the different wavelength ranges at the different timings, wherein the conversion beam coming from a first wavelength conversion sub-region of the plurality of wavelength conversion sub-regions irradiates a first beam splitting filter sub-region of the plurality of beam splitting filter sub-regions and the conversion beam coming from a second wavelength conversion sub-region of the plurality of wavelength conversion sub-regions irradiates a second beam splitting filter sub-region of the plurality of beam splitting filter sub-regions.

* * * * *